United States Patent
Sanghavi et al.

(10) Patent No.: US 12,518,296 B2
(45) Date of Patent: Jan. 6, 2026

(54) OBJECT INJECTION FRAMEWORK FOR DYNAMIC AND INTERACTIVE SCREENSAVER

(71) Applicant: ROKU, INC., San Jose, CA (US)

(72) Inventors: Mehul Sanghavi, San Jose, CA (US);
Saket Kumar, Fremont, CA (US);
Mark Goodwin, Mountain View, CA (US); Tamas Koloti, London (GB);
Matthew Macaluso, Los Angeles, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/216,453

(22) Filed: Jun. 29, 2023

(65) Prior Publication Data

US 2025/0005622 A1    Jan. 2, 2025

(51) Int. Cl.
*G06Q 30/0251* (2023.01)
*G06F 3/14* (2006.01)
*G06T 13/00* (2011.01)

(52) U.S. Cl.
CPC ........ *G06Q 30/0262* (2013.01); *G06F 3/14* (2013.01); *G06Q 30/0255* (2013.01); *G06T 13/00* (2013.01)

(58) Field of Classification Search
CPC ....... G06F 3/14; G06Q 30/0255; G06T 13/00
See application file for complete search history.

(56) References Cited

U.S. PATENT DOCUMENTS

| | | | |
|---|---|---|---|
| 2002/0026349 A1* | 2/2002 | Reilly | G06Q 30/0257 705/26.1 |
| 2006/0155763 A1* | 7/2006 | Lee | G06F 3/0481 |
| 2011/0151416 A1 | 6/2011 | Kurzweil et al. | |
| 2011/0246916 A1* | 10/2011 | Leskela | G06F 3/0488 345/173 |
| 2012/0287241 A1* | 11/2012 | Foord | H04N 21/4821 348/46 |

FOREIGN PATENT DOCUMENTS

CA    2741561 A1    5/2010

OTHER PUBLICATIONS

Extended European Search Report for European Application No. EP24185497.5, mailed on Nov. 15, 2024, 7 Pages.

* cited by examiner

*Primary Examiner* — Mario C. Iosif
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for dynamically adjusting a screensaver on a display device. An example embodiment operates by a media device detecting the initiation of a screensaver and requesting replacement objects to be injected into the screensaver while the screensaver is displayed on a display device. The media device may receive the replacement objects, select which replacement objects to be injected into the screensaver, and injecting the selected replacement objects into an off-screen portion of the screensaver prior to the off-screen portion being displayed on the displayed device.

18 Claims, 23 Drawing Sheets

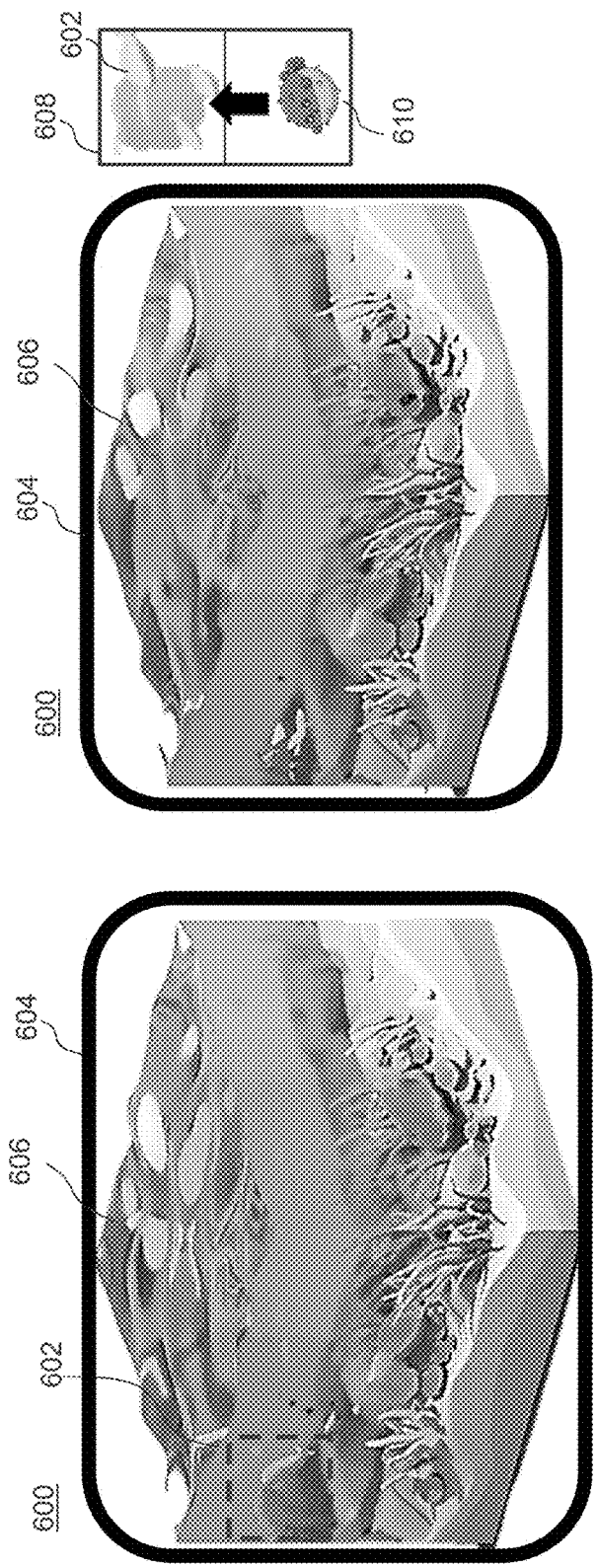

OBJECT INJECTION FRAMEWORK FOR DYNAMIC AND INTERACTIVE SCREENSAVER

FIELD

This disclosure is generally directed to dynamically modifying screensavers with a variety of content including personalized content and interactive content.

SUMMARY

Provided herein are system, apparatus, article of manufacture, method and/or computer program product embodiments, and/or combinations and sub-combinations thereof, for dynamically modifying screensavers as they are being displayed with personalized and updated content. In some aspects, a media device may include an object injection engine that injects new objects into an off-screen portion of a screensaver that is currently being displayed on a display device. In some aspects, displaying the screensaver may include displaying a portion of the screensaver on-screen of the display device while a remaining portion of the screensaver is off-screen of the display device. In some aspects, the screensaver includes a horizontal or vertical scrolling effect so that different portions of the screensaver are displayed sequentially in a loop. In some aspects, the display of the screensaver may be on a loop so that the portions of the screensaver may be repeated on the display over a certain interval of time.

In some aspects, the media device may initiate the screensaver for display on the display device. The screensaver may be divided into a plurality of panels (or portions) including a first panel and a second panel. The media device may transmit an object request to an object server while the first panel of the screensaver is currently displayed on the display device. The second panel may be off-screen and not currently displayed on the display device. The object request may include a request for a replacement object to replace a current object of the second panel of the screensaver. The media device may then receive the replacement object from the object server and replace the current object of the screensaver with the replacement object to form a modified second panel of the screensaver that now includes the replacement object instead of the current object. Replacement of the current object may be performed prior to displaying the second panel on the display device (i.e., in an off-screen portion of the screensaver). The media device may then continue the display loop of the screensaver by scrolling the screensaver such that the first panel is not displayed on a display device and the modified second panel of the screensaver is displayed on the display device.

In some aspects, various objects of a screensaver may be dynamically updated while the screensaver is displayed as part of a display loop. The display loop allows for on-screen and off-screen portions of the screensaver and the object injection framework of the present disclosure utilizes the off-screen portions to seamlessly inject new objects into the screensaver. Objects may be personalized based on user interest and information and may be provided by object providers (e.g., advertisers) as part of a campaign for reaching out to customers. Accordingly, a screensaver may be dynamically updated and personalized to a user's taste and based on requirements from object providers.

BRIEF DESCRIPTION OF THE FIGURES

The accompanying drawings are incorporated herein and form a part of the specification.

FIGS. 6A-6E illustrate exemplary injection of replacement objects in a foreground of a screensaver, according to some aspects.

In the drawings, like reference numbers generally indicate identical or similar elements. Additionally, generally, the left-most digit(s) of a reference number identifies the drawing in which the reference number first appears.

DETAILED DESCRIPTION

Figure 1:
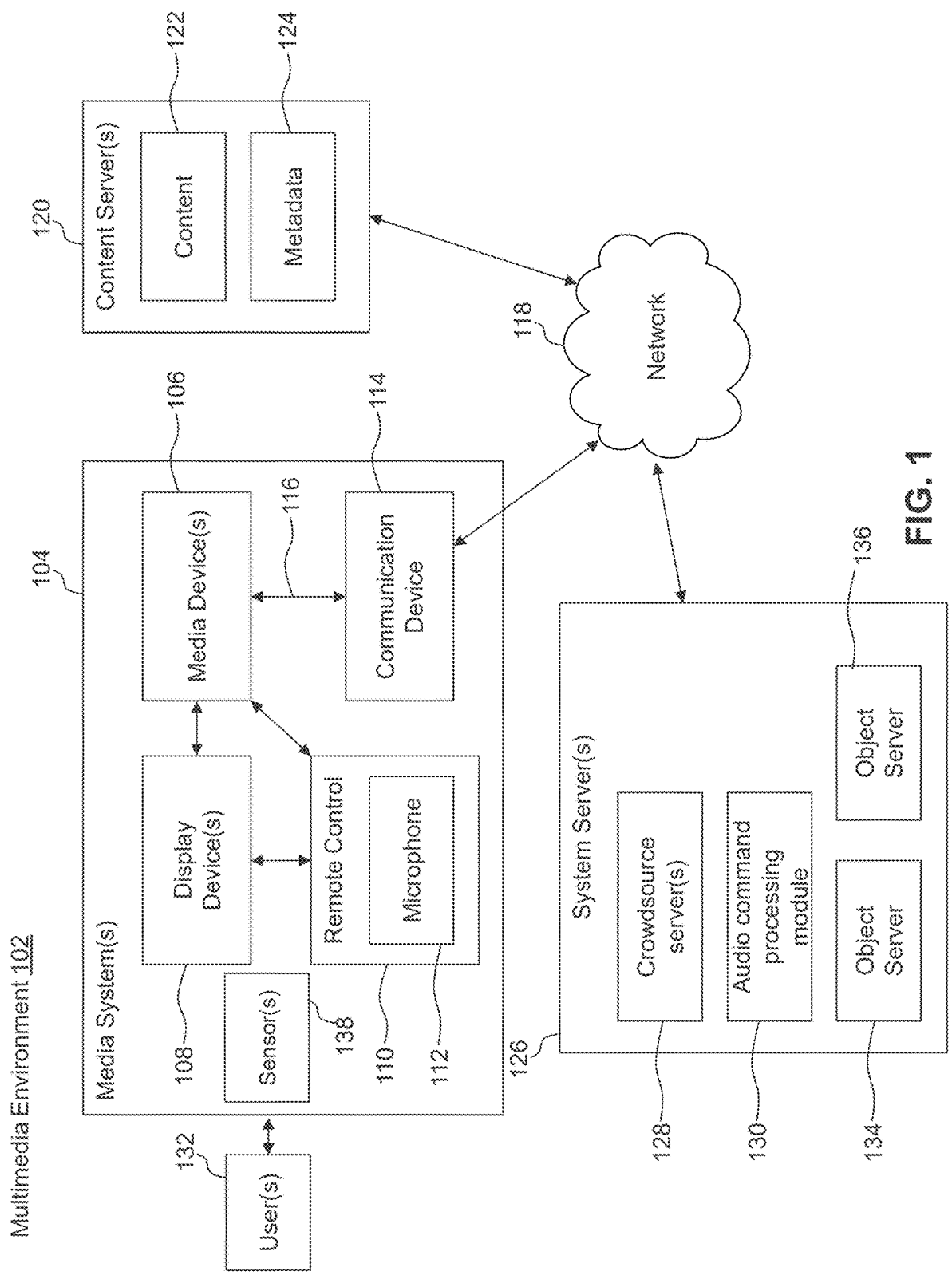
FIG. 1 illustrates a block diagram of a multimedia environment, according to some aspects.

Streaming media devices, such as those on over-the-top (OTT) platforms, typically display static screensavers such as moving images or video. Screensavers are displayed when the media device is in an idle or inactive state and are dismissed when the media device receives a command from a remote (e.g., a button press). Static screensavers are preset and images or aspects of the screensaver are not changed.

Provided herein are system, apparatus, device, method and/or computer program product aspects, and/or combinations and sub-combinations thereof, for dynamically modifying screensavers provided by media devices. In some aspects, modification may include personalizing screensavers based on user information collected by the media devices. Examples of modification include swapping one or more objects of the screensaver with replacement objects. Examples of objects include images, layers, audio, animated content, and video. Examples of personalization include selecting and inserting replacement object based on user information such as viewing history, demographic information, and user preferences. In this manner, the screensaver may be dynamically changed for each media device to present a more targeted experience within the screensaver.

In some aspects, objects are visual components of the screensaver and may be branded and/or implemented as advertising content. The media device may communicate with advertising sources to provide targeted branding within the screensaver. Replacement objects may be provided from advertising sources and dynamically selected and inserted into the screensaver as it is being displayed by the media device.

In some aspects, objects may be grouped thematically such as based on certain seasons (e.g., objects that reflect winter or summer), different scenery (e.g., cityscape, nature), different times of day (e.g., evening, morning, mid-afternoon), just to name a few examples. In some aspects, objects may be any shape and size visual component that is part of the screensaver, such as a building, a car, wildlife, plants, billboards, scenery, just to name a few examples.

In some aspects, the screensaver is a scrolling screensaver and composed of a dynamic image with multiple layers. In some aspects, the screensaver is configured so that it is not displayable all at once by a media device and is scrolled on the display. In other words, portions of the screensaver may be displayed by the media device while other portions of the screensaver remain off-screen. As the screensaver scrolls, new portions of the screensaver are displayed. The media device may implement an object injection framework to inject replacement objects into the off-screen portions of the screensaver while the screensaver is being displayed. Accordingly, as the screensaver scrolls and off-screen portions are now displayed, the replacement objects are displayed by the media device. In some aspects, injection refers to the insertion of replacement objects and/or the replacement of existing objects in the screensaver.

In some aspects, objects may be retrieved based on user information such as viewing history and user preferences. For example, objects may be downloaded or otherwise made accessible to a media device based on a user's history viewing certain television shows, shopping preferences (e.g., previously purchased content), and other information provided by the user such as preferred coffee shops and grocery stores.

In some aspects, objects may be interactive and navigable such that a user, via commands from a remote control, may navigate within the screensaver and explore additional content. As one example, an object may be a store image and, upon selection by the remote control, the screensaver may transition to a new screen depicting an interior of the store that would allow a user to view and virtually explore inside the store.

As used in the specification and the appended claims, "content items" may also be referred to as "content," "content data," "content information," "content asset," "multimedia asset data file," or simply "data" or "information". Content items may be any information or data that may be licensed to one or more individuals (or other entities, such as businesses or groups). Content may be electronic representations of video, audio, text, graphics, or the like which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether the format is presently known or developed in the future. The content items described herein may be electronic representations of music, spoken words, or other audio, which may be but is not limited to data files adhering to the MPEG1 Audio Layer 3 (.MP3) format, Adobe®, CableLabs 1.0, 1.1, 3.0, AVC, HEVC, H.264, Nielsen watermarks, V-chip data and Secondary Audio Programs (SAP), Sound Document (.ASND) format, or some other format configured to store electronic audio whether the format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (PSD) format or some other format for electronically storing text, graphics and/or other information whether the format is presently known or developed in the future. Content items may be any combination of the above-described formats.

Various aspects of this disclosure may be implemented using and/or may be part of a multimedia environment 102 shown in FIG. 1. It is noted, however, that multimedia environment 102 is provided solely for illustrative purposes, and is not limiting. Aspects of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 for delivering screensaver content to a media system 104 for dynamically updating screensavers, according to some aspects. Multimedia environment 102 illustrates an example environment, architecture, ecosystem, etc., in which various aspects of this disclosure may be implemented. However, multimedia environment 102 is provided solely for illustrative purposes, and is not limiting. Aspects of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to supporting an object injection framework for dynamically updating a screensaver at one or more media device(s) 106. This may include an object server 134 delivering replacement objects for local storage at media devices, both predictively and based on requests submitted by media devices. An object injection engine implemented at media device(s) 106 may dynamically update screensavers that are currently displayed by media device(s) 106 using the replacement objects. Replacement objects may include any type of media that can be utilized and displayed as part of a screensaver including static images, audio, animated images, infographics, video, and interactive objects that can receive and respond to user input. Replacement objects may be branded or otherwise provided by different content providers such as advertisers, program providers, and device manufacturers.

The multimedia environment 102 may include one or more media systems 104. A media system 104 comprises many devices and can be implemented within a single location, or in distributed locations, such as in one or more of a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. For example, there may be one or more display devices 108 of media system 104 with each display device 108 being located in a separate location. User(s) 132 may operate the media system 104 to select and view content, such as content 122.

Each media system 104 may include one or more media device(s) 106 each coupled to one or more display device(s) 108. It is noted that terms such as "coupled," "connected to," "attached," "linked," "combined" and similar terms may refer to physical, electrical, magnetic, logical, etc., connections, unless otherwise specified herein.

Media device(s) 106 may be a streaming media device, a streaming set-top box (STB), cable and satellite STB, a DVD or BLU-RAY device, an audio/video playback device, a cable box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some aspects, media device(s) 106 can be a part of, integrated with, operatively coupled to, and/or connected to its respective display device 108.

Each media device(s) 106 may be configured to communicate with network 118 via a communication device 114. The communication device 114 may include, for example, a cable modem or satellite TV transceiver. The media device(s) 106 may communicate with the communication device 114 over a link 116, wherein the link 116 may include wireless (such as WiFi) and/or wired connections. In some aspects, communication device 114 can be a part of, integrated with, operatively coupled to, and/or connected to a respective media device(s) 106 and/or a respective display device 108. Each media device(s) 106 may further be configured with components for displaying and modifying screensavers to display device 108.

In various aspects, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device(s) 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device(s) 106 and/or display device 108 using cellular, Bluetooth, infrared, etc., or any combination thereof. The remote control 110 may include a microphone 112, which is further described below. When implemented as a smartphone or tablet, operations of the remote control 110 may be provided by a software program installed on the smartphone or tablet that provide a user interface that includes controls of the remote control 110.

The multimedia environment 102 may include a plurality of object server(s) 120 (also called content providers, channels, or sources). Although only one content server 120 is shown in FIG. 1, in practice the multimedia environment 102 may include any number of object server(s) 120. Each content server 120 may be configured to communicate with network 118. Each content server 120 may be configured to communicate with network 118. Content server 120, media device(s) 106, display device 108, may be collectively referred to as a media device, which may be an extension of media system 104. In some aspects, a media device may include system server 126 as well.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or datan objects in electronic form. Content 122 may be the source displayed on display device 108.

In some aspects, metadata 124 comprises data about content 122. For example, metadata 124 may include closed captioning data, such as text data, associated with content 122. Metadata 124 may further include timeslots that link the closed captioning data to the audio data of content 122. The timeslots allow the display of the closed captioning data by display device 108 to be synced with the playback of audio data of content 122 such that the text provided by the closed captioning data matches the timeslot when the audio data is played such as by display device 108 or another sound playback device.

Metadata 124 may further include indicating or related to labels of the materials in the content 122, writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122 Metadata 124 may also or alternatively include one or more indexes of content 122, such as but not limited to a trick mode index.

The multimedia environment 102 may include one or more system server(s) 126. The system server(s) 126 may operate to support the media device(s) 106 from the cloud. It is noted that the structural and functional aspects of the system server(s) 126 may wholly or partially exist in the same or different ones of the system server(s) 126. System server(s) 126 and content server 120 together may be referred to as a media server system. An overall media device may include a media server system and media system 104. In some aspects, a media device may refer to the overall media device including the media server system and media system 104.

The media device(s) 106 may exist in thousands or millions of media systems 104. Accordingly, the media device(s) 106 may lend themselves to crowdsourcing aspects and, thus, the system server(s) 126 may include one or more crowdsource servers 128.

For example, using information received from the media device(s) 106 in the thousands and millions of media systems 104, the crowdsource server(s) 128 may identify similarities and overlaps in content requests and/or screensaver behavior received by and/or monitored by one or more media device(s) 106. Based on such information, the crowdsource server(s) 128 may identify patterns in the content requests and/or screensaver behavior, such as particular requests for movies or content, the length of time that a screensaver is displayed without interruption by the media device(s) 106, the number of times a screensaver is displayed for a certain time cycle, and any user interactions associated with the screensaver. Based on these identified patterns, crowdsource server(s) may generate recommendations for providing replacement objects to media device(s) 106; the replacement objects may be associated with the requested content by the same media device(s) 106 or by other media device(s) 106 associated with other users but that share similar demographic information. For example, these replacement objects may be associated with the movie and stored as metadata (e.g., metadata 124) for the movie so that subsequent requests for the movie may result in downloading the metadata. Playback of the movie by another media device(s) 106 may then result in automatically downloading related replacement objects that can be injected into screensavers which results in enhancing users' experience when screensavers are displayed. In some aspects, crowdsource server(s) 128 can be located at content server 120. In some aspects, some part of content server 120 functions can be implemented by system server 126 as well.

As another example, crowdsource server(s) 128 may initiate a watch party between multiple media device(s) 106, each of which may located at a different physical location and/or connected to different Wi-Fi networks. A watch party may comprise the synchronized playback of content across the multiple media device(s) 106. Aspects of the present disclosure may be applied to multiple media device(s) 106 such that the detection of user behavior or interaction by one or more media device(s) 106 or by system server 126 may result in the delivery of replacement objects at the multiple media device(s) 106.

In some aspects, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Object server 134 may store replacement objects that can be injected into screensavers provided by media device(s) 106. In some aspects, object server 134 may receive replacement objects from content providers, such as advertisers, and store the replacement objects for subsequent delivery to media device(s) 106. Object server 134 may preemptively deliver replacement objects to media device(s) 106 based on analysis of one or more of user behavior, information received from media device(s) 106, user preferences, content provider requests, requirements of a content delivery (e.g., advertisement) campaign, just to name a few examples. As one example, a content delivery campaign may require replacement objects, such as branded images of an advertiser and interactive storefronts associated with a retail company, to be delivered to media device(s) 106 and displayed periodically. In some aspects, object server 134 may provide replacement objects upon receiving a content request from media device(s) 106 such as upon initiation of the screensaver at the media device(s) 106. Object server 134 may then perform a determination of relevant replacement objects upon receiving the content request. The determination may be based on similar analysis of one or more of user behavior, information received from media device(s) 106, user preferences, content provider requests, requirements of a content delivery (e.g., advertisement) campaign.

In some aspects, system server(s) 126 may be implemented as an object manager 136 that stores user data for user(s) 132 associated with media device(s) 106. Examples of user data include loyalty program information (hotels, airlines), user trip information such as a user's upcoming trip itinerary or destination, user's dining history such as takeout orders or restaurant visits, user's shopping history including online and at brick and mortar stores, user's browsing history which may reflect searches for specific retailers, brands, or companies, user's mobile app history and usage such as ride-hailing apps, food delivery apps, or user mobile app notifications. In some aspects, object database 138 stores and maintains objects for delivery to media device(s) 106.

Object server 134 may use the user data to determine which objects should be delivered to media device(s) 106 associated with the user. For example, loyalty program information may be used to select objects associated with companies and/or brands associated with the user's loyalty programs. User trip information may be used to select object associated with the user's upcoming trip or destination so that the screensaver may be updated to reflect the cityscape of the trip or destination. User's dining history may be used to select objects associated with the restaurants. User's shopping history may be used to select objects associated with the companies or purchased items. A user's browsing history may be used to select objects that reflect the search history and may include interactive objects, such as an interactive retail storefront (see FIGS. 7A-7B), where a user can continue browsing via the screensaver.

In some aspects, objects that are injected into screensavers may be dynamic objects that can dynamically retrieve and display information from external sources such as object server 134 or a user's mobile device. For example, object server 134 may include objects that dynamically display information based on a user's mobile app history and/or usage and based on a user's mobile device notifications. A dynamic object may, for example, retrieve and display estimated delivery time for a takeout order placed via a remote application on a user's mobile device. As another example, a dynamic object may retrieve and display notifications from the user's mobile device.

In some aspects, media system(s) 104 may further include sensor(s) 140. In some aspects, sensor(s) 140 may be a proximity sensor that can detect presence of one or more users within a certain distance from media system(s) 104. In some aspects, sensor(s) 140 may be integrated into one or more devices of media system(s) 104 such as display device(s) 108, remote control 110, and media device(s) 106.

In some aspects, object injection may be triggered by the initiation of a screensaver by media device(s) 106. In some aspects, object injection may be triggered based on both the screensaver and presence information provided by sensor(s) 140. For example, if sensor(s) 140 does not detect user presence within a vicinity of media system(s) 104 while a screensaver is initiated or otherwise being displayed, media device(s) 106 may not trigger (or disable) object injection which results in display of an unmodified screensaver. If sensor(s) 140 does detect user presence while a screensaver is initiated or otherwise being displayed, media device(s) 106 may trigger (or enable) the object injection process to dynamically modify or update the screensaver with replacement objects.

Figure 2:
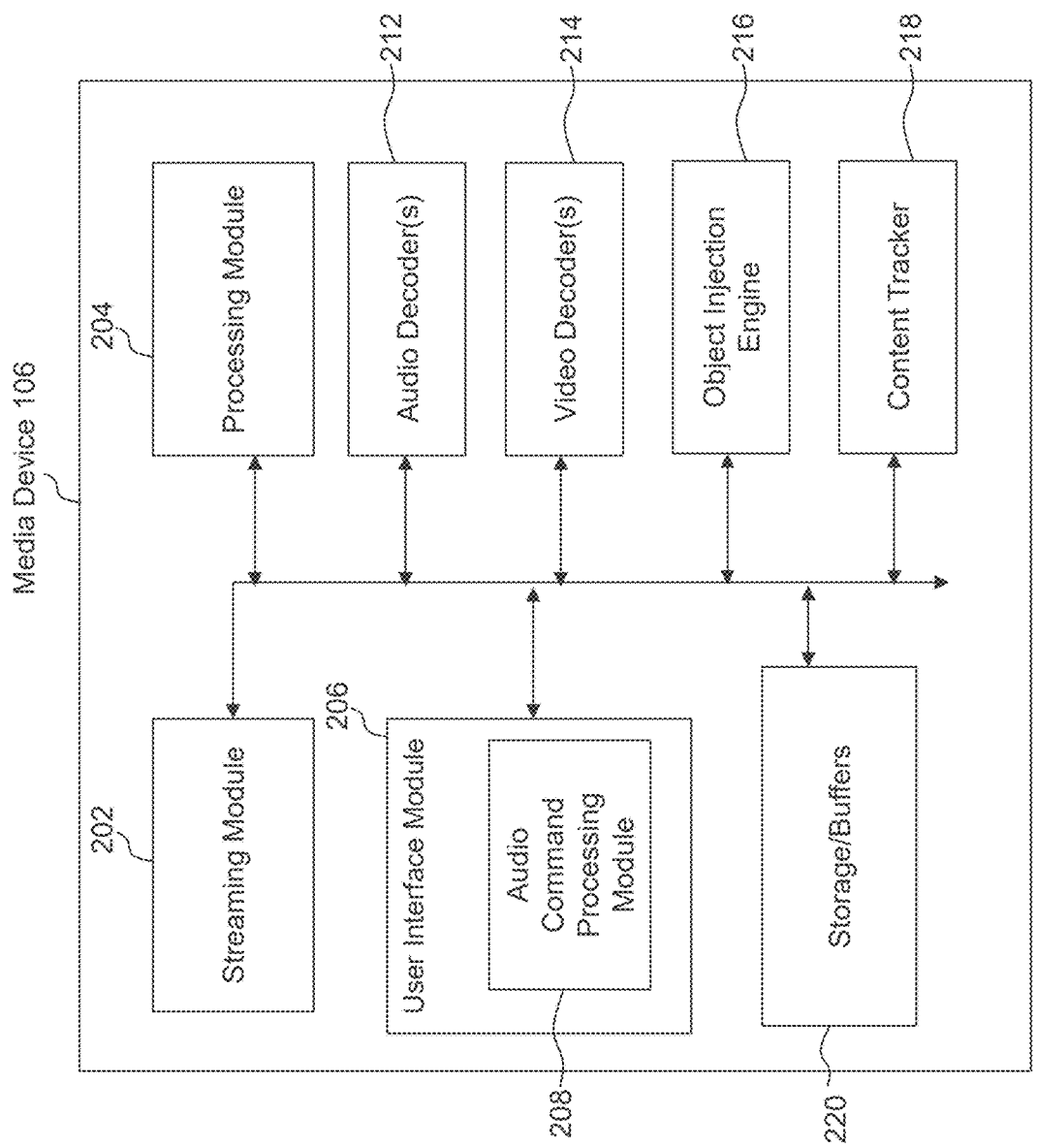
FIG. 2 illustrates a block diagram of a streaming media device, according to some aspects.

FIG. 2 illustrates a block diagram of an example media device(s) 106, according to some aspects. Media device(s) 106 may include a streaming module 202, processing module 204, user interface module 206, audio command processing module 208, audio decoder 212, video decoder 214, object injection engine 216, object tracker 218, storage/buffers 220, and screensaver engine 222.

In some aspects, object injection engine 216 may be configured to inject replacement objects into a screensaver while the screensaver is being displayed. In some aspects, the screensaver is a scrolling screensaver where one or more portions of the screensaver are displayed in a loop. Object injection engine 216 may replace objects that are located in off-screen portions of the screensaver with replacement objects such that the replacement objects are displayed as the screensaver is visually scrolling on a display device, which causes the previously off-screen portions of the screensaver to now be displayed on the display device.

In some aspects, one portion of the screensaver, such as the background layer may be stationary while other portions, such as the middle or foreground layers are displayed in a loop. One example of this embodiment is a fish tank where the background layer of the fish tank remains the same and objects, such as fish, are displayed in a loop in the middle and/or foreground layers of the screensaver.

Object injection engine 216 may make determinations as to which replacement objects are injected into the screensaver, when to inject replacement objects into the screensaver, and where to inject the replacement objects within the screensaver. These determinations may be made directly by object injection engine 216 or based on instructions received by object injection engine 216 from an external source, such as system server(s) 126. Determinations of which replacement objects to select may be based on one or more parameters such as user demographics, user viewing history, user shopping history, user preferences, and content campaign requirements associated with the replacement objects.

In some aspects, object injection engine 216 may be configured to communicate with an object source, such as system server(s) 126 to retrieve replacement objects, for example, in response to content requests. Content requests may be invoked by object injection engine 216 before the screensaver is displayed and/or while the screensaver is being displayed, such as upon media device(s) 106 initiating the display of the screensaver. In some aspects, content requests from object injection engine 216 may be for different objects in the screensaver which can be located at different portions of the screensaver, such as, a particular location of a background layer, a particular location of a middle layer, and/or a particular location of a foreground layer.

In some aspects, object injection engine 216 may be configured to implement restrictions for injecting certain replacement objects into screensavers. Examples of restrictions include the frequency that replacement objects are displayed, horizontal separation between replacement objects provided by different object providers to maximize user engagement, avoid content fatigue, and maintain compliance with content campaign requirements provided by respective object providers. In some aspects, replacement objects may be categorized based on their product category. For example, replacement objects may be associated with car companies, retail stores, electronics companies, media content (such as new movies, new TV shows, new songs), streaming services, just to name a few examples. As one example of horizontal separation, each rotation or loop of one or more portions of the screensaver can be modified to ensure that replacement objects of a first company in a product category are displayed a certain temporal and/or physical distance from replacement objects of a second company in the same product category. As another example, a content campaign requirement may specify a frequency threshold for displaying its objects on the screensaver, such as to avoid fatiguing viewers in a manner that would impact user sentiment Object tracker 218 may be configured to track object metrics including the placement and display of objects (which include replacement objects) in the screensaver. Object tracker 218 may track the frequency that objects are injected into screensavers and the frequency that objects are displayed. Tracked object metrics may be utilized to ensure compliance with display requirements, horizontal spacing requirements, and/or campaign requirements. Object tracker 218 may communicate the metrics to system server(s) 126 for storage and integration with analysis performed by crowdsource server 128. Object tracker 218 may further communicate the metrics with object injection engine 216.

Screensaver engine 222 may be configured to initiate a screensaver upon detection of a display condition such as an idle threshold. Screensaver engine 222 may further be configured to trigger object requests for replacement objects and receiving updated screensavers from object injection engine 216. Screensaver engine 222 may further be configured to display the updated screensavers from object injection engine 216.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Exemplary Display of Objects in Screensaver

In some aspects, a media device may include an object injection engine that injects new objects into an off-screen portion of a screensaver that is currently being displayed on a display device. Objects may be selected for injection based on personalizing the screensaver to the user associated with the media device and/or part of a content campaign from an object provider (e.g., advertiser). In some aspects, displaying the screensaver may include displaying the screensaver in a display loop such that a portion of the screensaver on-screen of the display device while a remaining portion of the screensaver is off-screen of the display device. In some aspects, the display loop may include a horizontal or a vertical scrolling effect so that different portions of the screensaver are displayed sequentially and may be repeated. In some aspects, the object injection engine may modify one or more objects of an off-screen portion of the screensaver by injecting replacement objects into the screensaver to replace the one or more objects. The effect is that various aspects of the screensaver may be changed between each loop to present a screensaver that is dynamic and tailored to user tastes.

In some aspects, media device(s) 106 may provide screensaver for display on display device 108. While the screensaver is being displayed, object injection engine 216 of media device(s) 106 may be operating in the background determining when to inject replacement objects into off-screen portions of the screensaver. For example, object injection engine 216 may replace a current object in an off-screen portion of the screensaver with a replacement object.

Visual replacement objects may be grouped based on size (i.e., size of the image), type of visual object (e.g., a building, a car, a landscape, etc.), and intended location of the screensaver (e.g., foreground layer, middle layer, background layer). Object injection engine 216 may select replacement objects based on size, object type, and intended location. For example, object injection engine 216 may select a replacement object having at least one of the following characteristics: a size within a threshold amount of the size of the object to be replaced, the same object type as the object to be replaced, and/or the same intended location of the screensaver as the object to be replaced.

In some aspects, replacement objects may include metadata indicating the objects that they can replace. For example, a replacement object, such as a building, may include the parameters about the objects that it can replace within the screensaver. Object injection engine 216 may then match the metadata of the replacement object to one or more objects in the screensaver and perform the injection of the replacement object to replace the one or more objects.

Streaming module 202 may transmit the screensaver to the display device 108. Streaming module 202 is in communication with object injection engine 216 to display modified portions of the screensaver. Replacement objects may be stored in storage/buffers 208 for later selection and injection by object injection engine 216.

FIGS. 3A-3D illustrate exemplary display sequences of a screensaver by a media device, according to some aspects.

Figure 3A:
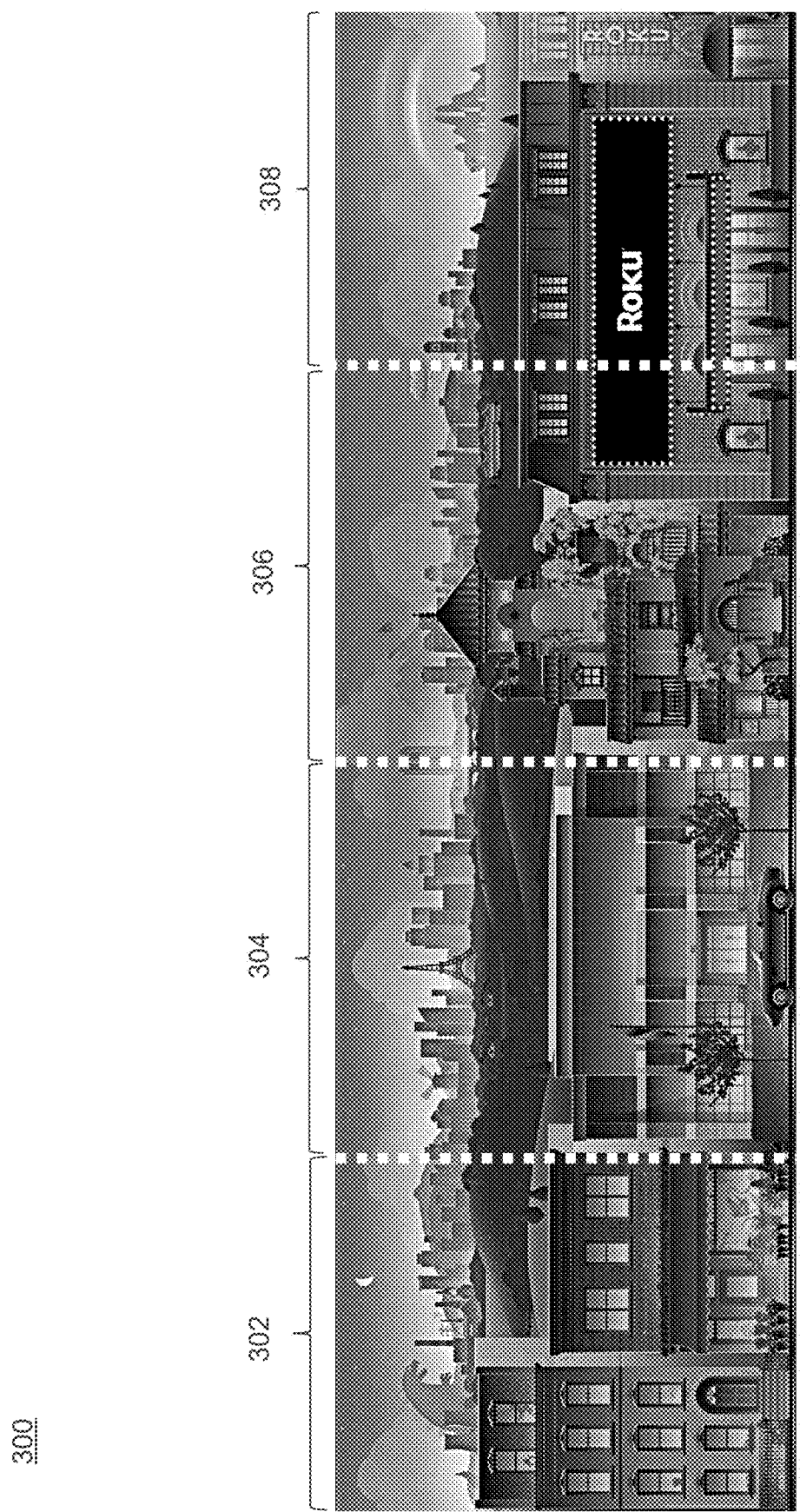
FIGS. 3A-3D illustrate exemplary display sequences of a screensaver by a media device, according to some aspects.

FIG. 3A illustrates an screensaver 300 with exemplary multiple portions, or panels 302-308. Screensaver 300 may be displayed on a loop. To facilitate the object injection framework, screensaver 300 may be divided into multiple portions so that a portion of screensaver 300 is not displayed, i.e., off-screen, and another portion is displayed, i.e., on-screen. The number, shape, and configuration of portions of screensaver 300 is merely exemplary and other numbers, shapes, and configurations are possible for dividing screensaver 300.

Figure 3B:
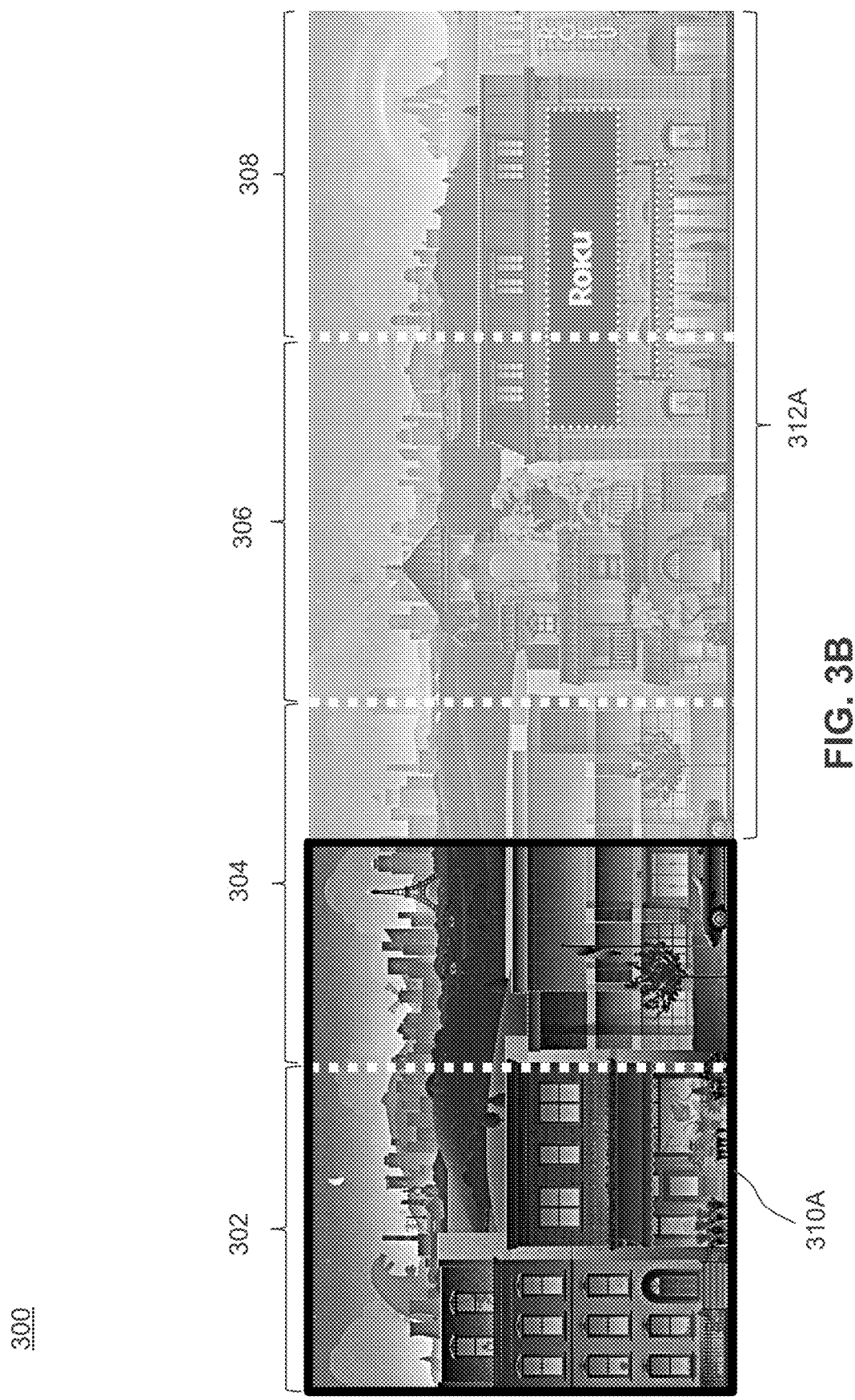

FIG. 3B illustrates an exemplary display of screensaver 300 on a viewer, such as display device 108, with an on-screen portion 310A and off-screen portion 312A. On-screen portion 310A refers to a portion of screensaver 300 that is displayed on the viewer. Viewer receives the screensaver 300 from a media device, such as media device(s) 106. Panel 302 and part of panel 304 may be displayed on the viewer as part of the on-screen portion 310A while another part of panel 304 and panels 306, 308 are not displayed as part of off-screen portion 312A.

Figure 3C:
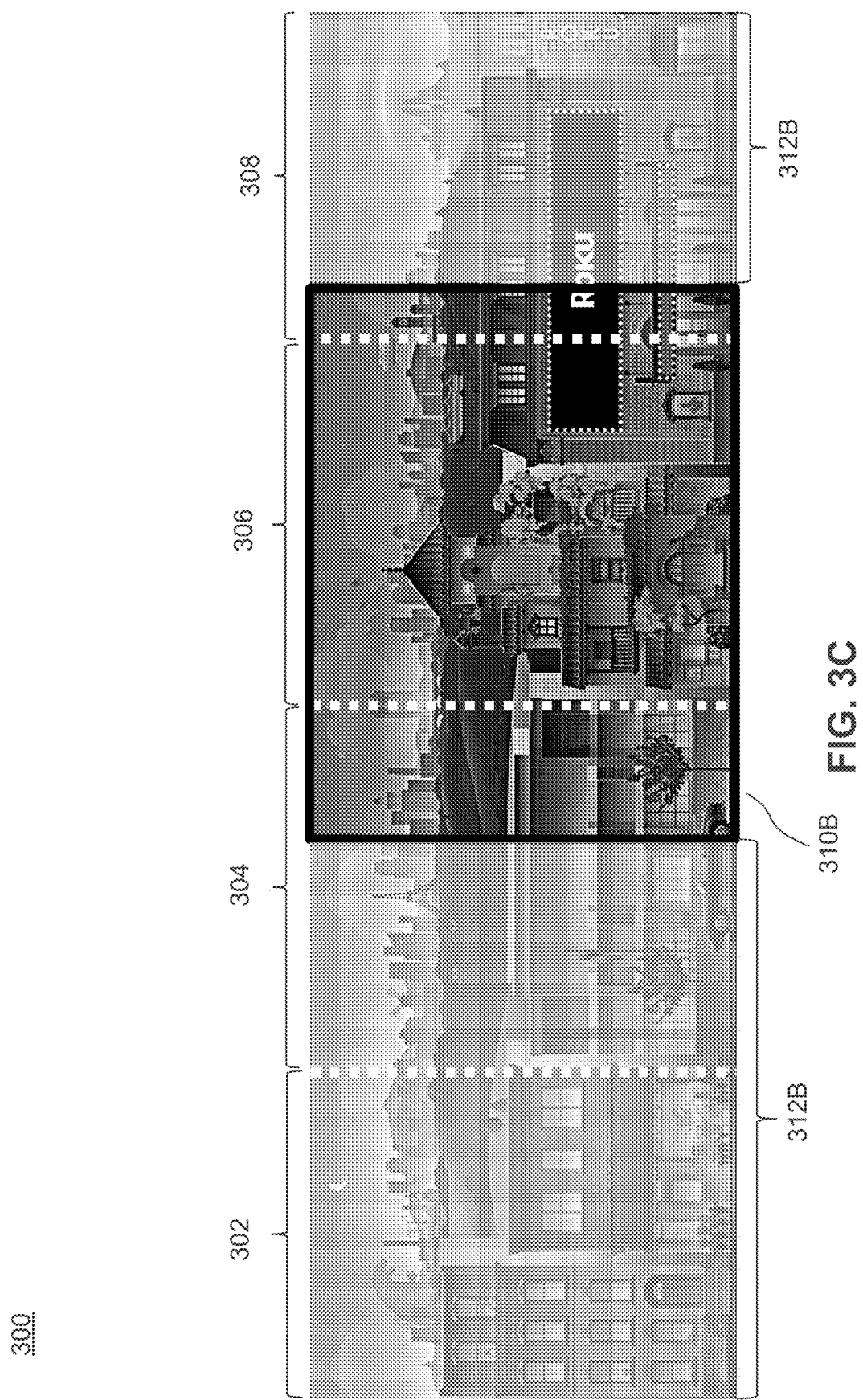

FIG. 3C illustrates an exemplary display of screensaver 300 with an on-screen portion 310B and off-screen portion 312B. Screensaver 300 is scrolled along the viewer such that on-screen portion 310B shows different panels of screensaver 300 and different panels now off-screen as part of off-screen portion 312B. For example, panel 306 and parts of panels 304 and 308 may be displayed by the viewer as on-screen portion 310B while panel 302 and other parts of panels 304 and 308 are not displayed as part of off-screen portion 312B.

Figure 3D:
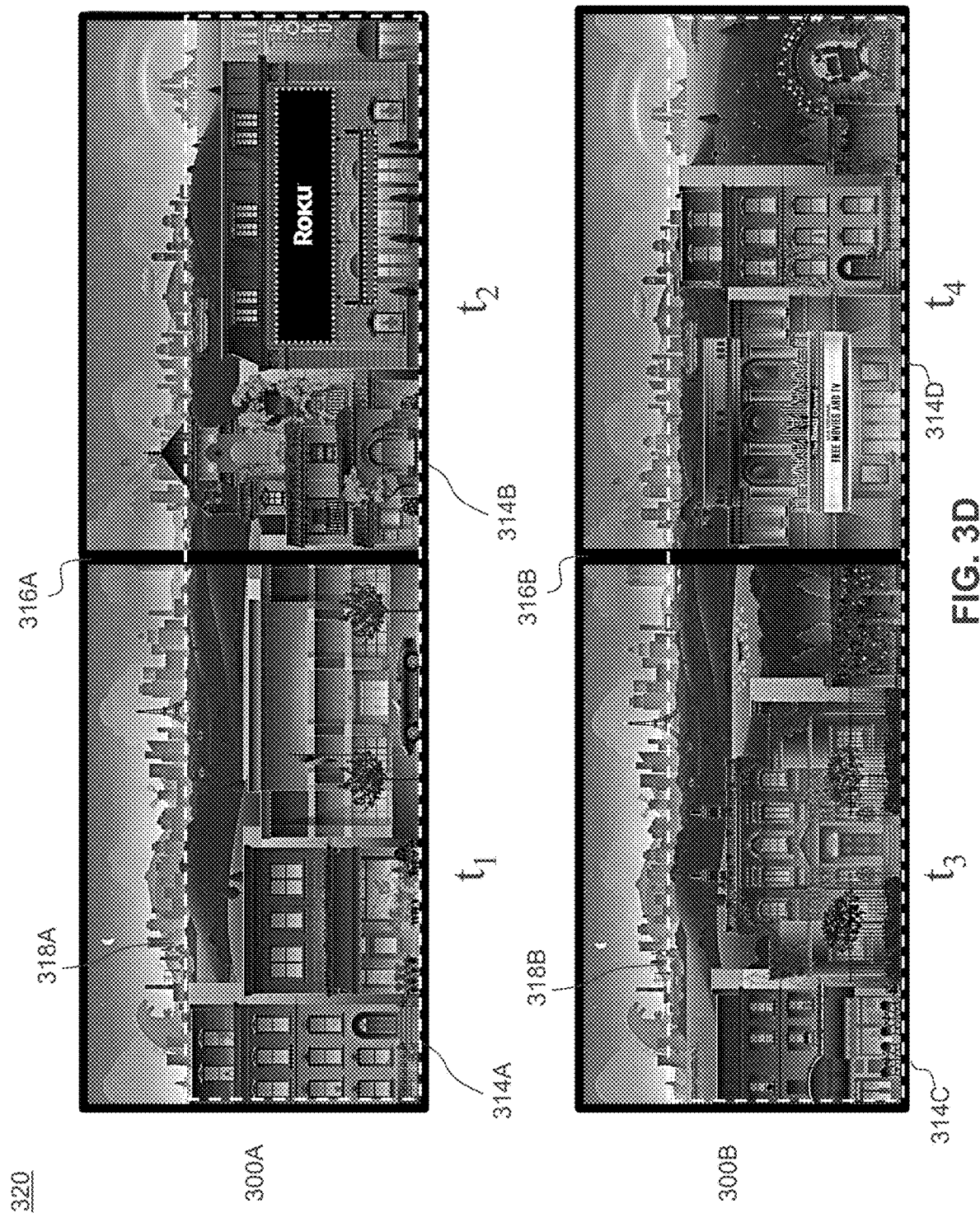

FIG. 3D illustrates an exemplary display loop 320 of a screensaver, according to some aspects. In some aspects, media device(s) 106 provides a scrolling screensaver for display which may be modified as time progresses. Display loop 320 may include the display of portions of a screensaver that have been modified with replacement object during the display loop 320. Display loop 320 refers to looping the display of a screensaver on a viewer, such as display device(s) 108. Display loop 320 may include a first loop 300A that includes times $t_1$ and $t_2$ and a second loop 300B that includes times $t_3$ and $t_4$. At times $t_1$ and $t_2$, first loop 300A includes the display of first image 316A, that includes objects 318A in a foreground layer, and at times $t_3$ and $t_4$, second loop 300B includes the display of second image 316B, that includes replacement objects 318B in the foreground layer. For example, at $t_1$, a first portion of first image 316A is displayed as on-screen portion ($t_1$) 314A. At $t_2$, a second portion of first image 316A is displayed as an on-screen portion ($t_2$) 314B.

At the end of first loop 300A (i.e., $t_2$), display loop 320 starts the next loop, second loop 300B. In some aspects, display loop 320 may display the first image 316A again in the next loop, meaning that no objects of the screensaver have been replaced with replacement objects. In the embodiment shown in FIG. 3D, object injection engine 216 has modified certain objects of the screensaver resulting in second image 316B. Object injection engine 216 has injected replacement objects 318B into a foreground layer of the screensaver, replacing objects 318A, and resulting in second image 316B. In this embodiment, other portions of first image 316A (e.g., a background layer, a middle layer) remain the unchanged (i.e., no replacement objects)

At $t_3$, a first portion of second image 316B is displayed as on-screen portion ($t_3$) 314C At $t_4$, a second portion of second image 316B is displayed as an on-screen portion ($t_4$) 314D.

It is understood that the number of loops in display loop 320 may be configurable and is not limited to the two loops depicted in FIG. 3D.

In some aspects, portions of the screensaver may be looped at different looping speeds. For example, a background layer of first image 316A may be looped at a first looping speed, a middle layer of first image 316A may be looped at a second looping speed, and a foreground layer of first image 316A may be looped at a third looping speed. The looping speeds of each layer may be the same or different. Media device(s) 106 may adjust the looping speeds of each layer of the screensaver to create a parallax scrolling effect.

In some aspects, media device(s) 106 may adjust a looping speed based on a desired or requested viewing time associated with objects. For example, the looping speed of a foreground layer that includes an object may be slowed to increase display time on a viewer so that the object is displayed on the viewer for the required viewing time.

Exemplary Object Injection of Screensavers

Figure 4A:
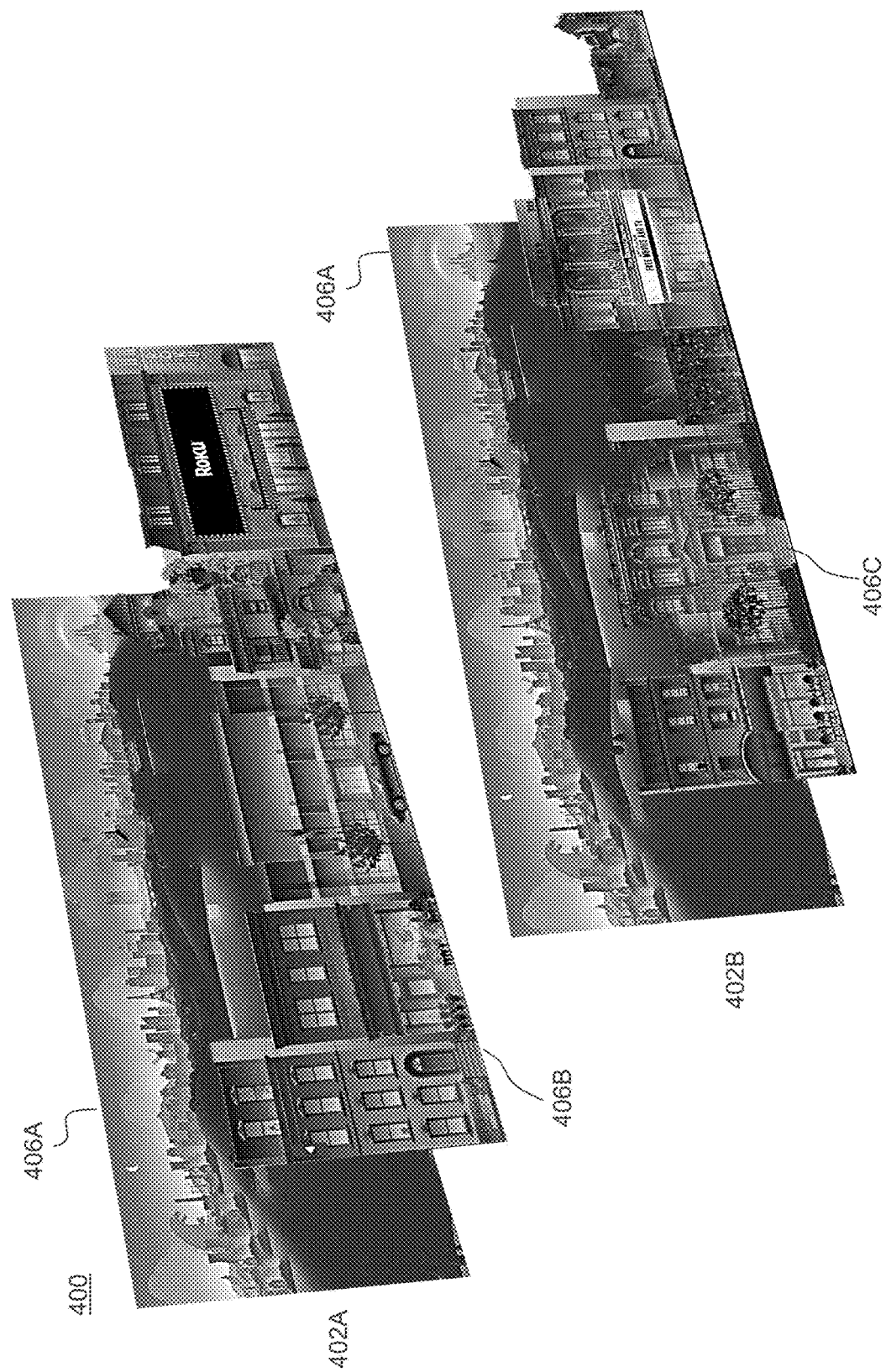
FIGS. 4A-4C illustrate exemplary replacement objects of a screensaver, according to some aspects.
Figure 4B:
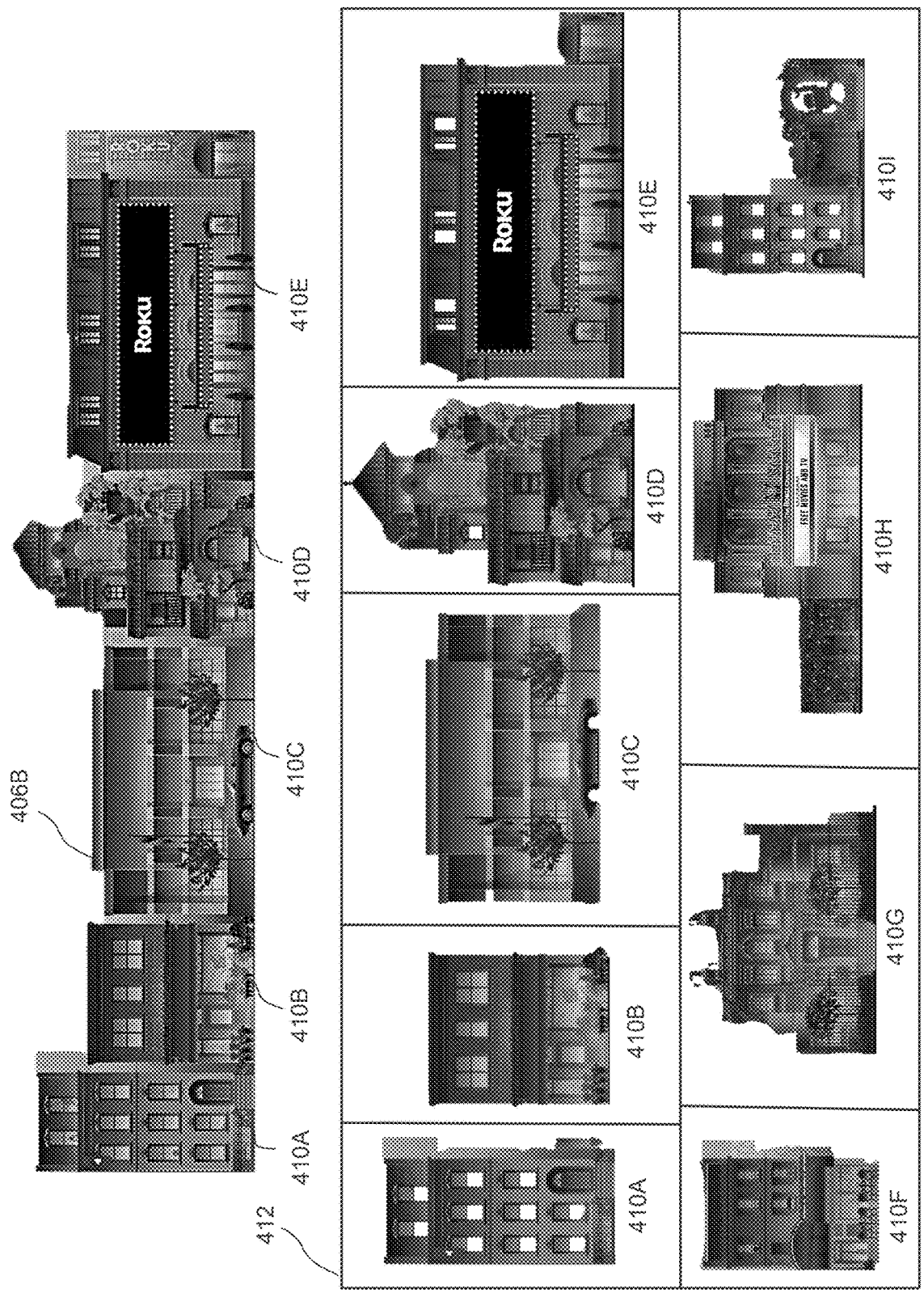
Figure 4C:
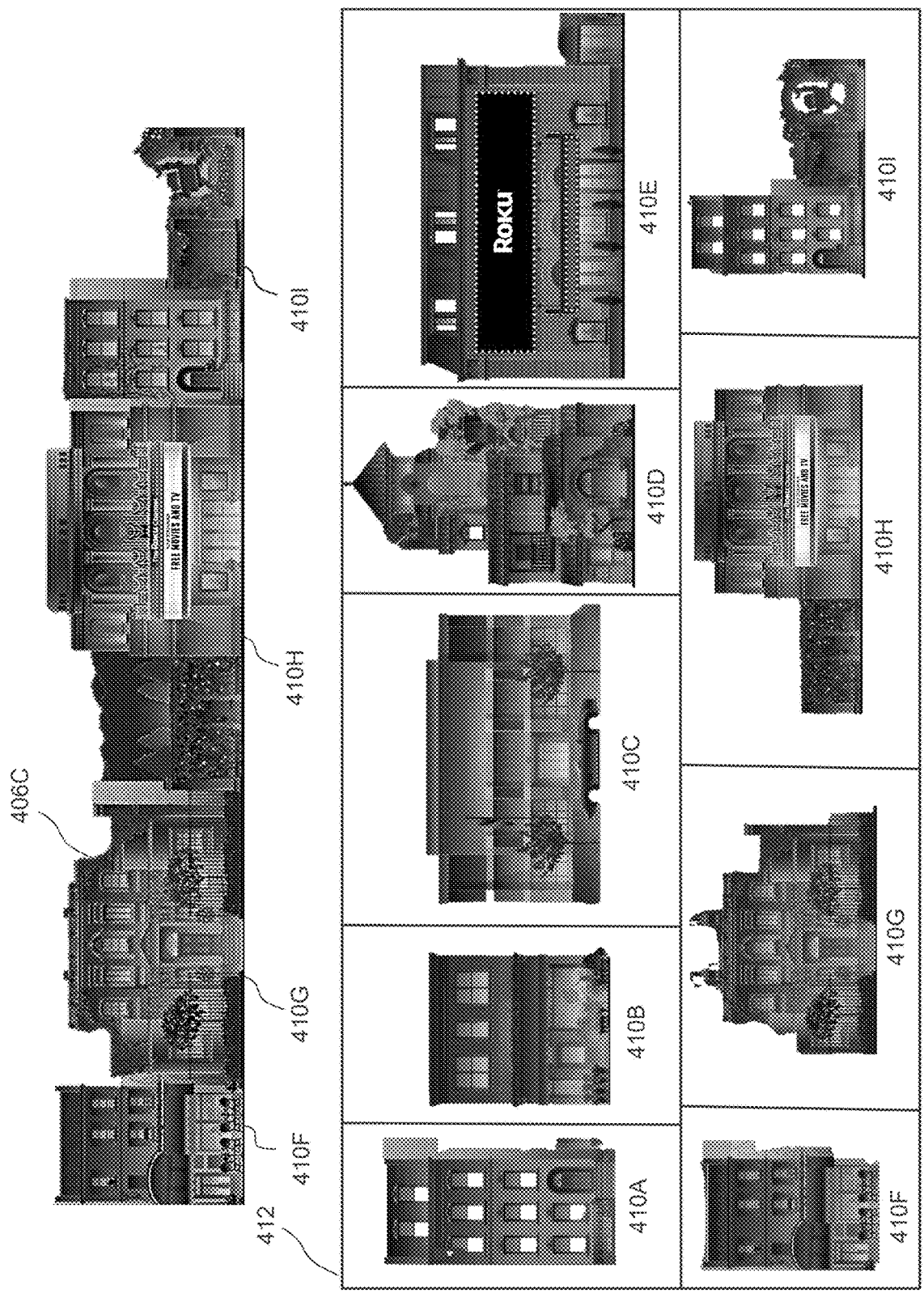

FIGS. 4A-4C illustrate exemplary replacement objects of a screensaver 400, according to some aspects.

FIG. 4A provides an exploded view of a screensaver 400 that includes first image 402A and second image 402B. First image 402A may include background layer 406A and a foreground layer 406B and second image 402B may include background layer 406A and foreground layer 406C. It is understood that the number of layers in a screensaver may be configurable and is not limited to the two layers depicted in FIG. 4A.

First image 402A of screensaver 400 may be displayed during a loop of a display loop of screensaver 400. During this loop, object injection engine 216 may be processing off-screen portions of screensaver 400 and making determinations whether to inject replacement objects into screensaver 400. In this embodiment, foreground layer 406B includes objects including a variety of buildings and street scenes. In some aspects, object injection engine 216 may inject replacement objects into screensaver resulting in foreground layer 406C that includes the replacement objects, such as different buildings and street scenes. In some aspects, object injection engine 216 may independently select replacement objects and/or may receive instructions or commands from an external source, such as system server(s) 126. Object injection engine 216 performs the object injection while screensaver 400 is being displayed and on portions of the screensaver that are off-screen so that objects are replaced while they are not being displayed.

In some aspects, object injection engine 216 may implement injection policies. Injection policies may be implemented on a per-user, or per-household basis, just to name a few examples. A per-user policy are policies that are specific to a user and, in some aspects, may be implemented by a provider or a server, such as whether the user has a "premium" no-advertisement status which would prevent object injection for that particular user or whether a user has been designated to receive more or less types of objects, such as advertisements, to be displayed on the screensaver. A policy may tune the rate of object injection (e.g., frequency) for certain users based on tracked behaviors or preferences. Other per-user policies may be based on user characteristics, such as visual impairment; such policies may direct object injection engine 216 to introduce transitions with brighter colors/effects or additional contrast for select users. Yet another example is a policy that reduces motion for users who have specified reduced motion/stop parallax settings.

Another example of a per-user policy includes notifications from mobile applications installed on the user's mobile device. In some aspects, the mobile device may be linked to the media device(s) 116 such that notifications received or transmitted by the user's mobile device are mirrored in a notification object injected into the screensaver.

Policies may also be implemented on a per-household basis which are policies that can be applied to all users in a household. Examples of such policies relate to notification objects where notifications are to be displayed to all users in the household. For example, notifications may be tied to text messages from family members and the notification object injected into the screensaver may display family member text messages on the screensaver.

In some aspects, policies may be provided by object providers or servers, such as system server(s) 126.

In some aspects, each loop of a display loop may represent a new screensaver stage. For example, a first loop can be a first stage of the screensaver with a first set of objects. In some aspects, object injection engine 216 may also apply a first injection policy to this first loop. Next, a second loop of the display loop may represent a second stage of the screensaver where object injection engine 216 may inject new replacement objects to replace the first set of objects, and in some aspects, a different injection policy. This process may continue for any of the subsequent loops in the display loop based on specific parameters associated with the replacement objects or injection policies implemented by object injection engine 216. From a user standpoint, a display loop of the screensaver would look contiguous and seamless, but with the individual loops of display loop presenting different set of objects.

FIG. 4B depicts foreground layer 406B and a database 412 of objects maintained by object injection engine 216. It is noted that there the term object refers to any objects already implemented in a screensaver and replacement object refers to any object that is injected into the screensaver to replace another object. Database 412 therefore comprises objects 410A-410I, any of which may be considered replacement objects when they are selected by object injection engine 216 to be injected into a screensaver.

In this embodiment, foreground layer 406B may comprise objects 410A-410E. During a display loop of screensaver 400, object injection engine 216 may determine (or receive instructions) for replacing objects in first image 402A with replacement objects.

In some aspects, this determination may be based on parameters associated with the replacement objects such as a viewing time parameter, an display parameter, and a user personalization parameter. A viewing time parameter may indicate the amount of viewing time that the replacement object should be displayed as part of the screensaver 400. A display parameter may indicate a frequency that the replacement object should be displayed as part of the screensaver 400. A user personalization parameter may indicate predicted preferences based on user browsing history, user viewing history, user purchasing history, and/or user settings. The predicted preference may indicate a likelihood that a user associated with media device(s) 106 may be interested in certain replacement objects. In some aspects, the user personalization parameter may indicate preferred object types such as nature, cityscapes, content brands (e.g., car companies, clothing companies, retail companies), and content types (e.g., movies, music, TV shows). Object injection engine 216 may select replacement objects based on one or more of these parameters.

After selecting replacement objects, object injection engine 216 may inject the selected replacement objects into screensaver 400. Metadata associated with each replacement object may indicate which portions of the screensaver 400 that they should be injected and/or which objects that the replacement object can replace. For example, the metadata may indicate that a replacement object may be injected into all layers (e.g, background, middle, foreground) or only one layer of the screensaver. The metadata data also indicate which object types that the replacement object can replacement. For example, the metadata may indicate that a replacement object can replace all types of objects (e.g., buildings, vehicles, animals, characters) or only certain types of objects (e.g., a building replacement object may only replace another building object).

FIG. 4C depicts foreground layer 406C and database 412. Foreground layer 406C may comprise objects 410F-410I after object injection engine 216 has injected objects 410F-410I into the screensaver. During a display loop, screensaver 400 may then be displayed with foreground layer 406C (in place of foreground layer 406B).

FIGS. 5A-5F illustrate exemplary injection of replacement objects in a screensaver, according to some aspects.

Figure 5A:
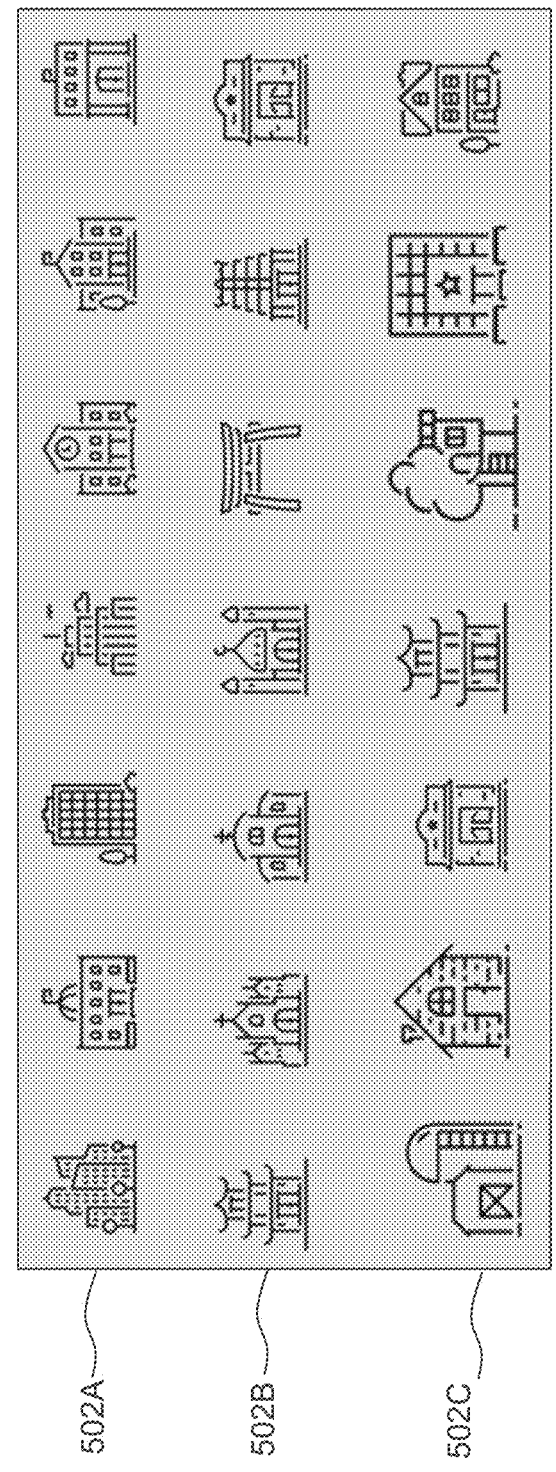
FIGS. 5A-5F illustrate exemplary injection of replacement objects in a screensaver, according to some aspects.

FIG. 5A illustrates an exemplary screensaver 500 that includes background objects 502A, middle objects 502B, and foreground objects 502C. FIG. 5A depicts screensaver 500 as it would be displayed on a viewer, such as display device(s) 106.

Figure 5B:
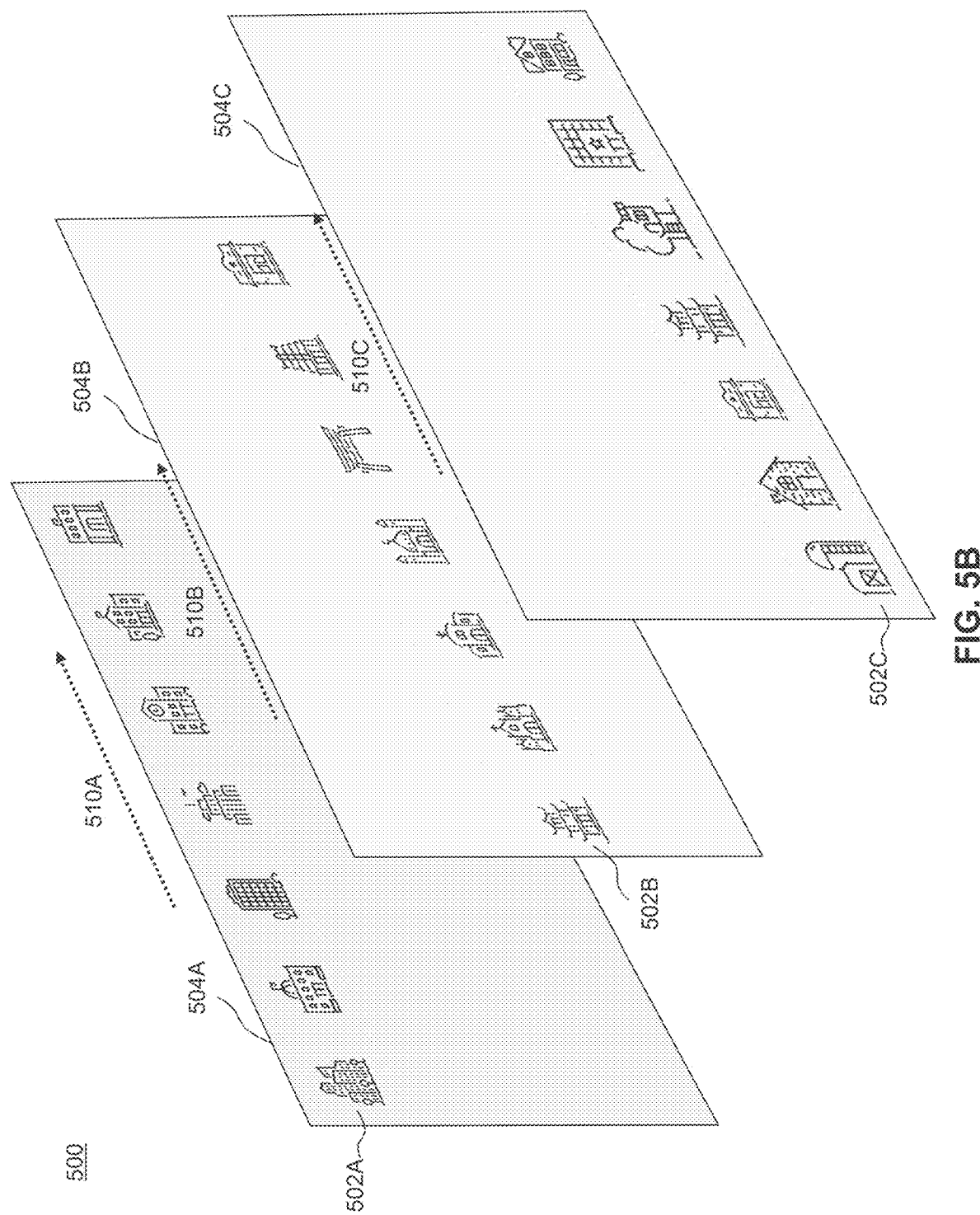

FIG. 5B illustrates an exploded view of screensaver 500 and depicting background objects 502A in a background layer 504A, middle objects 502B in a middle layer 504B, and foreground objects 502C in a foreground layer 504C. Each layer may have a respective looping speed which dictates the speed at which each layer is scrolled during display of screensaver 500. For example, background layer 504A may have a first looping speed 510A, middle layer 504B may have a second looping speed 510B, and foregoing layer 504A may have a third looping speed 510C. Object injection engine 216 may control the looping speed for each layer based on desired viewing characteristics which can be dictated by metadata associated with each object that is currently implemented within screensaver 500. Looping speeds for each layer may be the same or varied and can be based on the metadata of the objects in the respective layer. For example, an object in background layer 504A may specify the first looping speed 510A, an object in middle layer 504B may specify the second looping speed 510B, and an object in foreground layer 504C may specify the third looping speed 510C. Metadata may include a priority rank for each object so resolve conflicting metadata between objects in the same layer where the metadata of objects having a higher priority may take priority over metadata of objects having a lower priority.

Figure 5C:
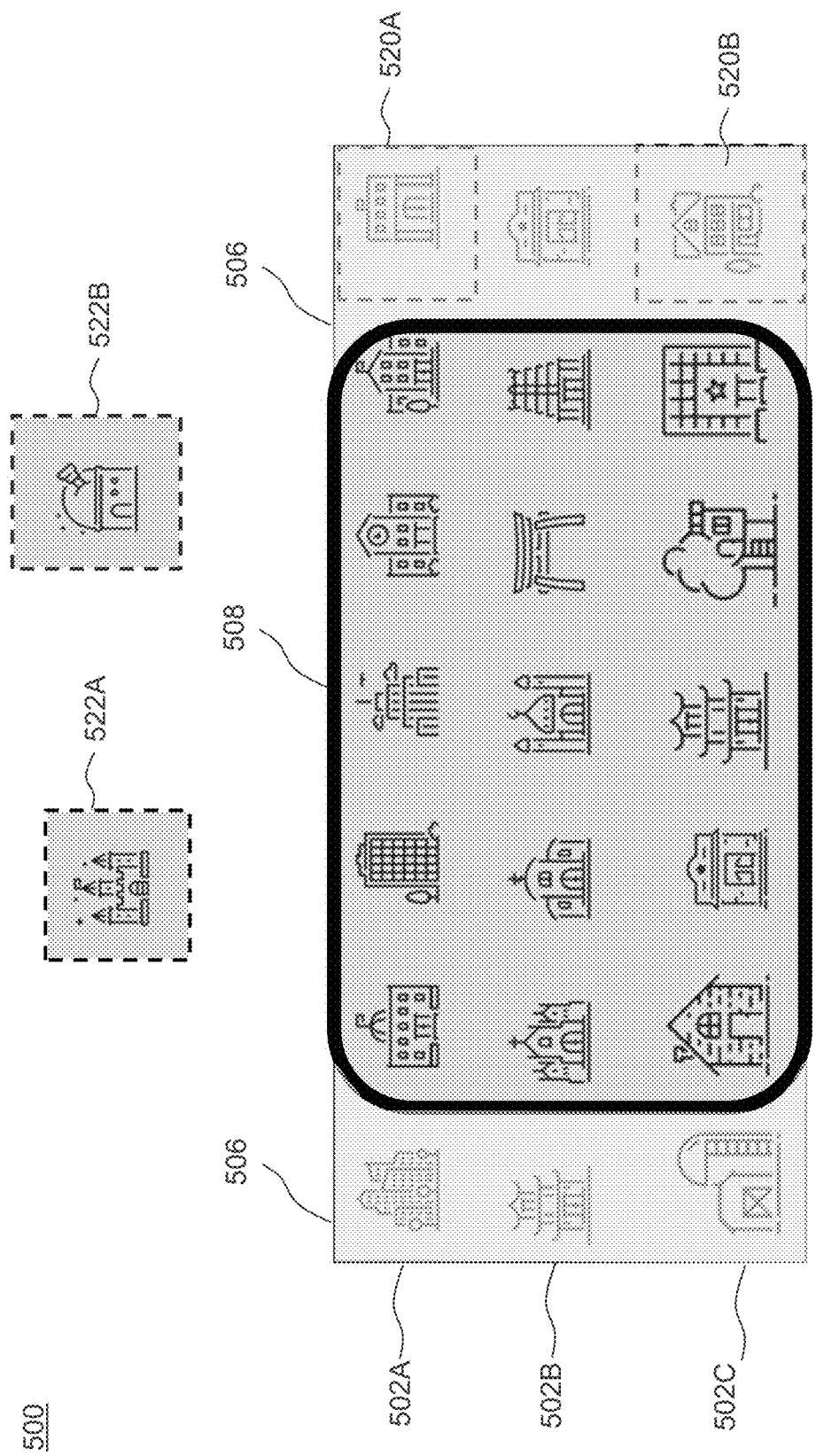

FIG. 5C illustrates screensaver 500 that includes an on-screen portion 508 and off-screen portion 506. In some aspects, object injection engine 216 may identify a background object 520A of the background objects 502A and a foreground object 520B of the foreground objects 502C as candidates for replacement with replacement objects 522A-522B to be injected into screensaver. This identification may be based on any number of factors matching the object to the replacement including a matching size characteristic, matching layer placement, and display characteristics associated with both the objects to be replaced and the replacement objects.

For example, object injection engine 216 may determine that a size of background object 520A matches a size characteristic of replacement object 522A (and not replacement object 522B) and that a size of foreground object 520B matches a size characteristic of replacement object 522B. On this basis alone, object injection engine 216 may select background object 520A as a candidate for replacement by replacement object 522A and foreground object 520B as a candidate for replacement by replacement object 522B.

Alternatively or additionally, object injection engine 216 may consider other factors. For example, object injection engine 216 may determine whether replacement objects 522A-522B have a layer placement requirement. For example, replacement object 522B may have a requirement that it can be placed in a foreground layer of the screensaver 500.

As another example, object injection engine 216 may examine display characteristics associated with any of background objects 502A, middle objects 502B, foreground objects 502, and replacement objects 522A-522B. Examples of display characteristics include frequency limits, display time limits, and horizontal separation requirements. Frequency limits may indicate the number of times an object may be displayed. Display time limits may indicate a time duration that an object may be displayed. Horizontal separation requirements specify a distance between objects in screensaver as it is being scrolled on the viewer. A distance may be specified in terms of visual distance (e.g., a number of loops or a number of objects) or temporal distance (e.g., five minutes).

In some aspects, a replacement object may be associated with a brand, object provider, content type, and its horizontal separation requirement may specify that the replacement object cannot be visually displayed in the same loop (or within two loops) of another object of a competing brand, a competing object provider, or of the same content type. For example, a replacement object may be associated with a new release movie (i.e., content type) and its horizontal separation requirement may specify that the replacement object cannot be displayed in screensaver 500 within the same loop (or a threshold number of loops) as another movie that is being released on the same day, in the same category (e.g., action, comedy), or by a competing movie studio. As another example, a replacement object may be associated with a retail store (e.g., brand and object provider) and its horizontal separation requirement may specify that the replacement object cannot be displayed in screensaver 500 within the same loop (or a threshold number of loops) and/or within a threshold number of minutes as an object associated with another retail store.

Figure 5D:
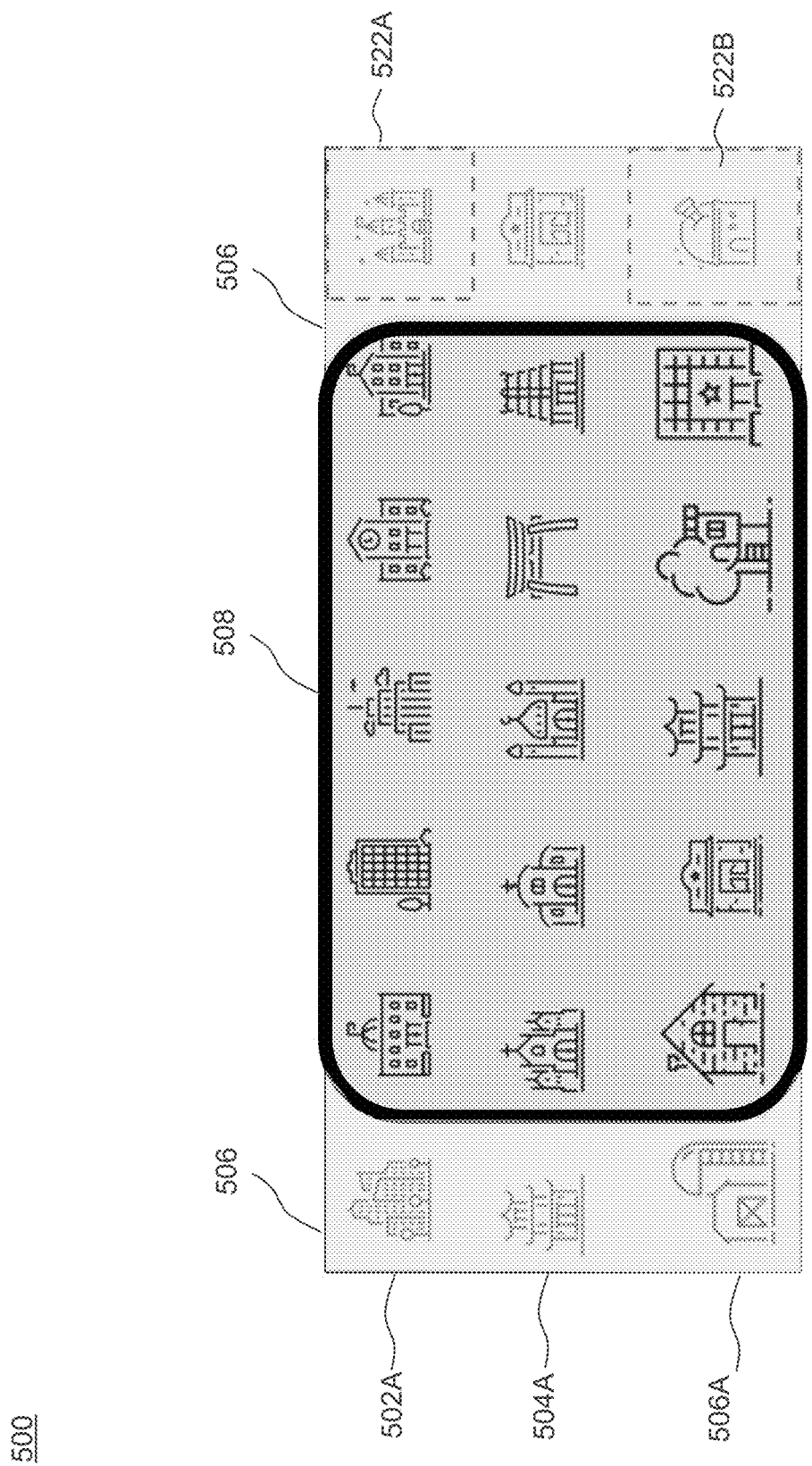

FIG. 5D illustrates screensaver 500 that includes an on-screen portion 508 and off-screen portion 506 with replacement objects 522A-522B injected into off-screen portion 506, replacing background object 520A and foreground object 520B. Object injection engine 216 performs the injection on off-screen portion 506 prior to off-screen portion 506 being displayed on the viewer.

Figure 5E:
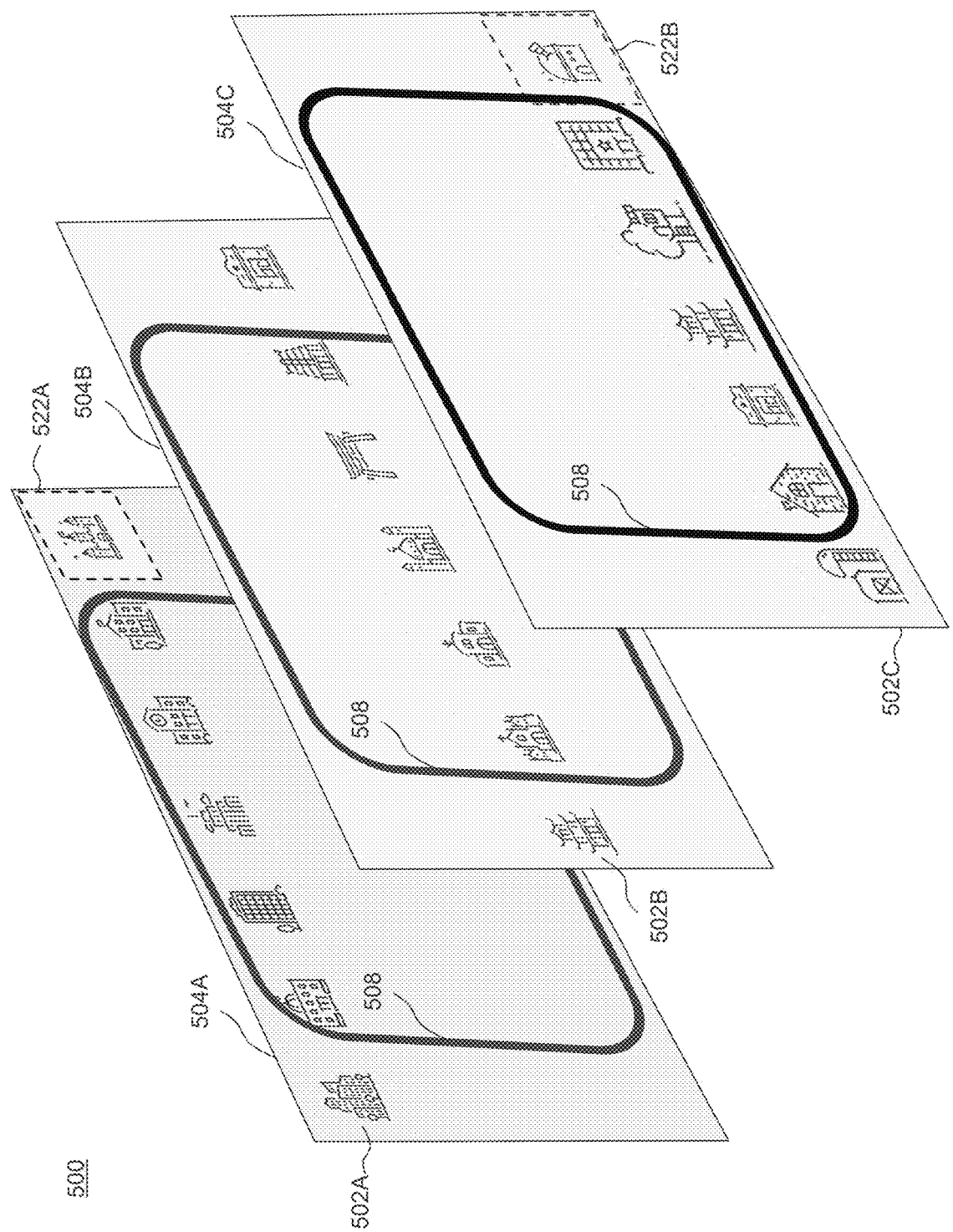

FIG. 5E illustrates an exploded view of screensaver 500 with background layer 504A, middle layer 504B, and foreground layer 504C. Object injection engine 216 injects replacement object 522A into background layer 504A, replacing background object 520A and injects replacement object 522B into foreground layer 504C, replacing foreground object 520B. This injection occurs while background object 520A and foreground object 520B are not displayed in on-screen portion 508.

Figure 5F:
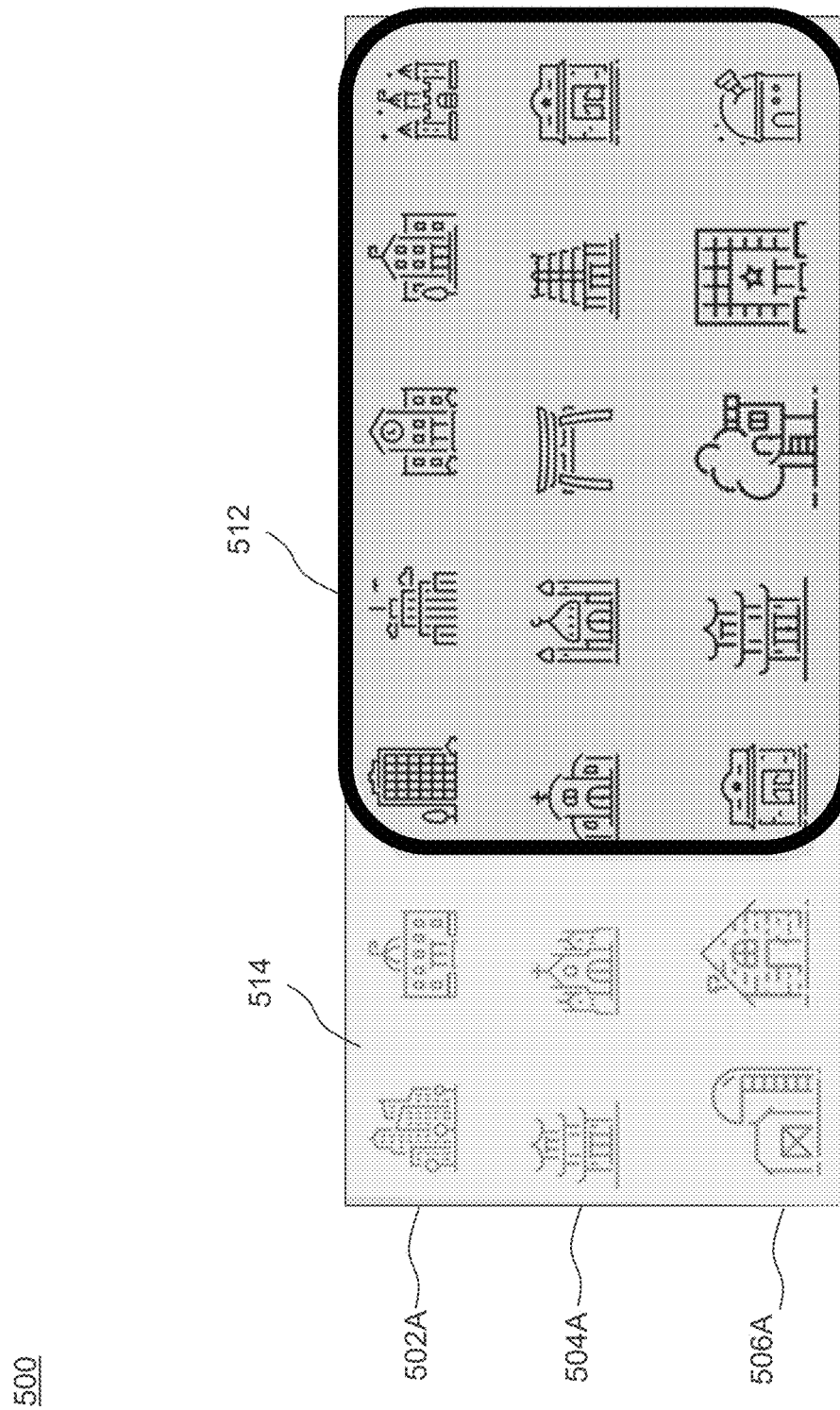

FIG. 5F illustrates screensaver 500 that includes on-screen portion 512 and off-screen portion 514. On-screen portion 512 displays screensaver 500 with the injected replacement objects.

FIGS. 6A-6E illustrate exemplary injection of replacement objects in a foreground of a screensaver, according to some aspects.

Figure 6B:
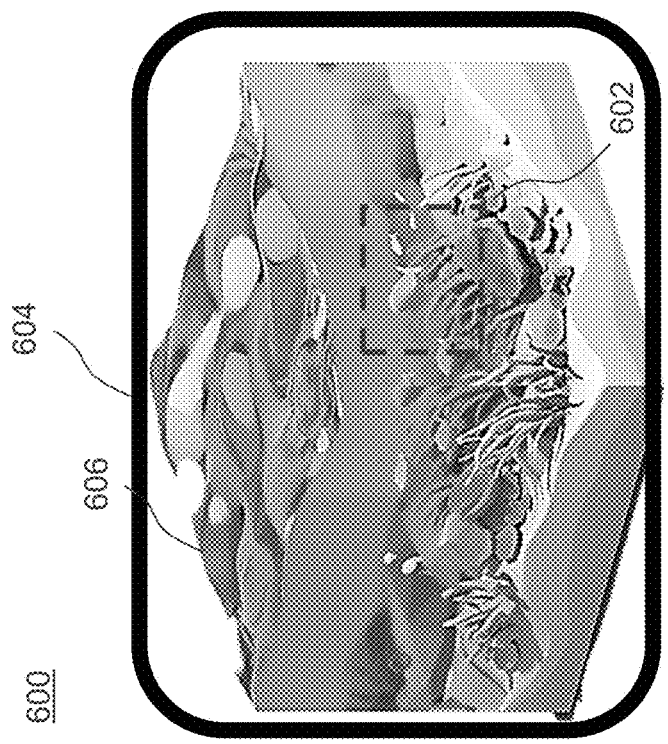
Figure 6A:
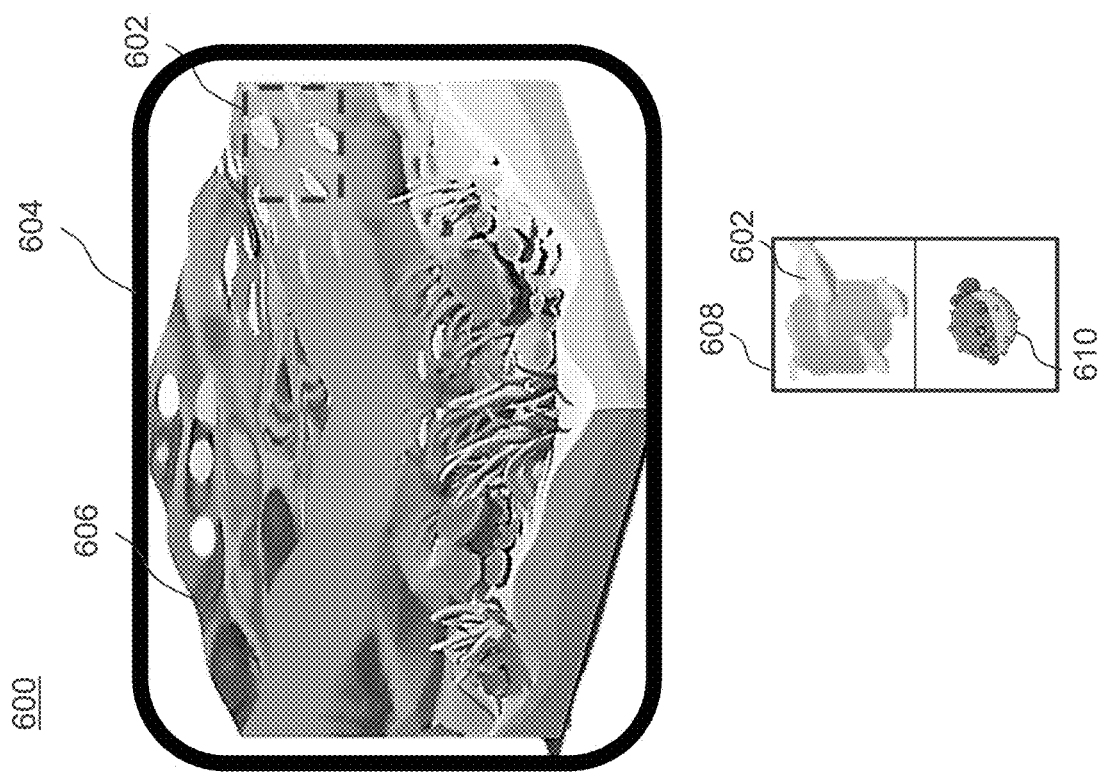

FIG. 6A illustrates a screensaver 600 being displayed in on-screen portion 604. Screensaver 600 includes a foreground layer with animated object 602 moving in a foreground of screensaver 600. Screensaver 600 may also include a background layer 606. In some aspects, background layer 606 may be statically displayed (not on a loop or scrolling). In these aspects, display loops of screensaver 600 would include a non-scrolling (may still be animated) image for background layer 606. Other portions of screensaver 600 may be scrolling within on-screen portion 604. For example, animated object 602 may be depicted as scrolling across background layer 606.

FIG. 6A also depicts a database 608 that stores animated object 602 and a second animated object 602 which could be used as a replacement object for animated object 602.

FIG. 6B illustrates a screensaver 600 displaying an on-screen portion 604 with background layer 606 and animated object 602 in a new position of screensaver 600. In some aspects, animated object 602 may be considered part of the foreground layer or a middle layer of screensaver 600.

FIG. 6C illustrates screensaver 600 displaying an on-screen portion 604 with background layer 606 and animated object 602 in a new position of screensaver 600. In some aspects, FIGS. 6A-6C illustrate one loop of a display loop for screensaver 600 that includes displaying animated object 602 at various positions of screensaver 600.

FIG. 6D illustrates the end of one loop for screensaver 600 with animated object 602 now not visible in on-screen portion 604. Background layer 606 may remain visible in on-screen portion 604. Object injection engine 216 may make a determination to inject a second animated object 610 into screensaver 600 as a replacement object replacing animated object 602. In some aspects, another parameter considered by object injection engine 216 in make this determination is matching visual characteristics of each object. In this embodiment, object injection engine 216 may select second animated object 610 because it is another animated object (matching a visual characteristic of animated object 602) and because they have the same object type (e.g., both animated object 602 and second animated object 610 are fish).

FIG. 6E illustrates the start of a new loop of screensaver 600 with second animated object 610 injected into screensaver 600 in place of animated object 602.

Figure 7A:
FIGS. 7A-7B illustrate exemplary interactive screensaver objects, according to some aspects.
Figure 7B:
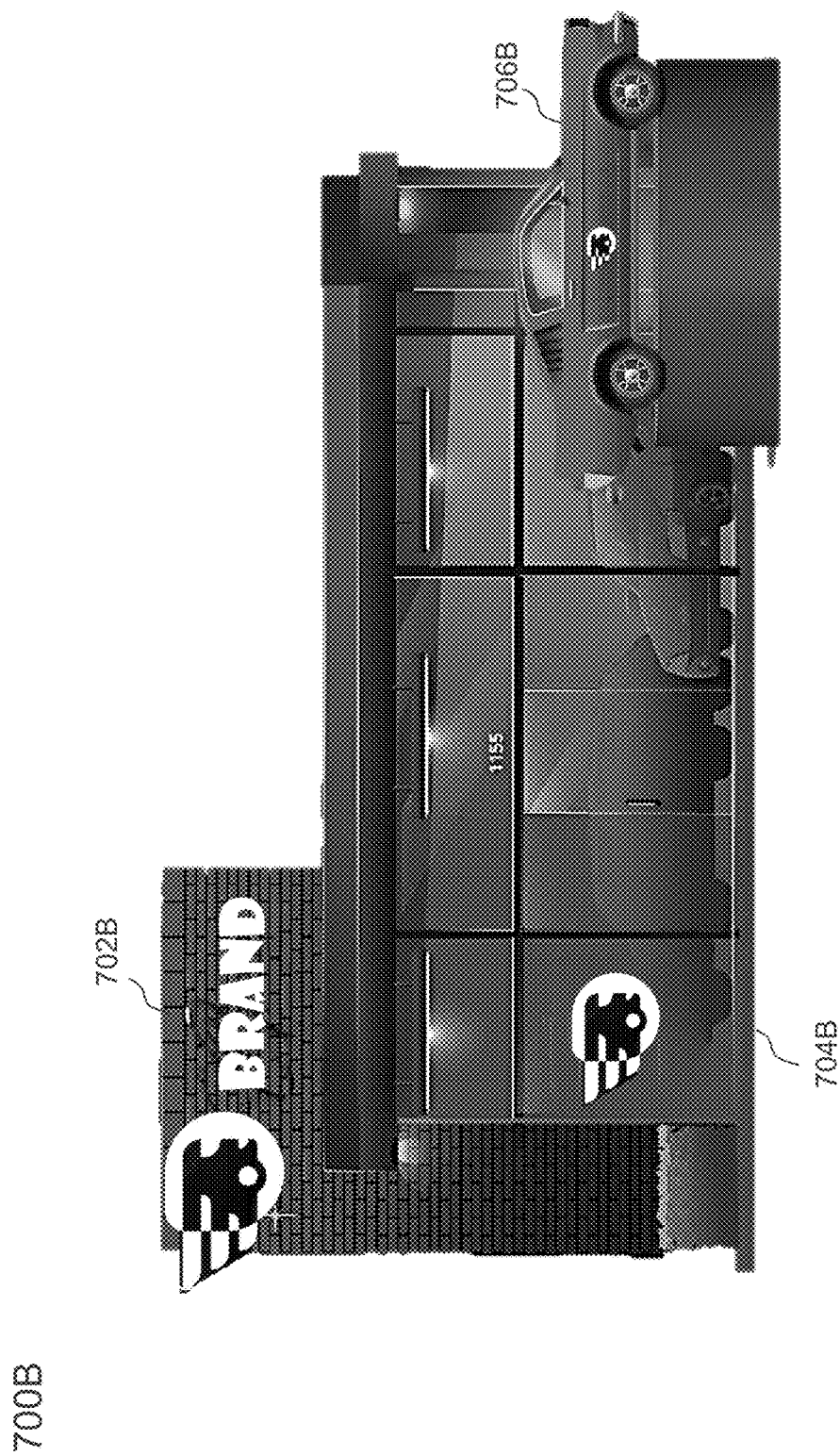

FIGS. 7A-7B illustrate exemplary interactive screensaver objects, according to some aspects. In some aspects, objects may be interactive, configured to receive user input, and configured to display content that is associated with or otherwise linked to the object.

FIG. 7A depicts an interactive screensaver object 700A that includes interactive components 702A, 704A, and 706A. In some aspects, interactive components 702A, 704A, and 706A may be interactive and configured to receive user input, such as an audio command selecting the component (e.g., received from microphone 112) or a user command (e.g., received from remote control 110). Selection of an interactive component may result in transitioning display of a screensaver to additional content that is associated with the selected interactive component. As one example, interactive screensaver object 700A, which is displayed as part of a screensaver, depicts a retail storefront. Selection of one of interactive components 702A, 704A, and 706A may cause the display of content associated with the retail store. For example, selection of interactive component 702A may result in displaying a website of the retail store, selection of interactive component 704A may result in displaying in a virtual store associated with the retail store. The virtual store may further include items associated with the retail store that may be purchased directly from the virtual store. Selection of interactive component 706A may result in displaying more information about a particular product or service offered by the retail store.

FIG. 7B depicts an interactive screensaver object 700B that includes replacement interactive components 702B, 704B, and 706B. In some aspects, object injection engine 216 may rebrand interactive screensaver objects with interactive components that are associated with different providers, and inject these rebranded interactive screensaver objects into a screensaver. For example, interactive components 702A, 704A, and 706A may be associated with a first retail store while interactive components 702B, 704B, and 706B may be associated with a second retail store. Selection of interactive components 702B, 704B, and 706B may lead to the display of content associated with the second retail store.

Exemplary Methods for Object Injection

Figure 8:
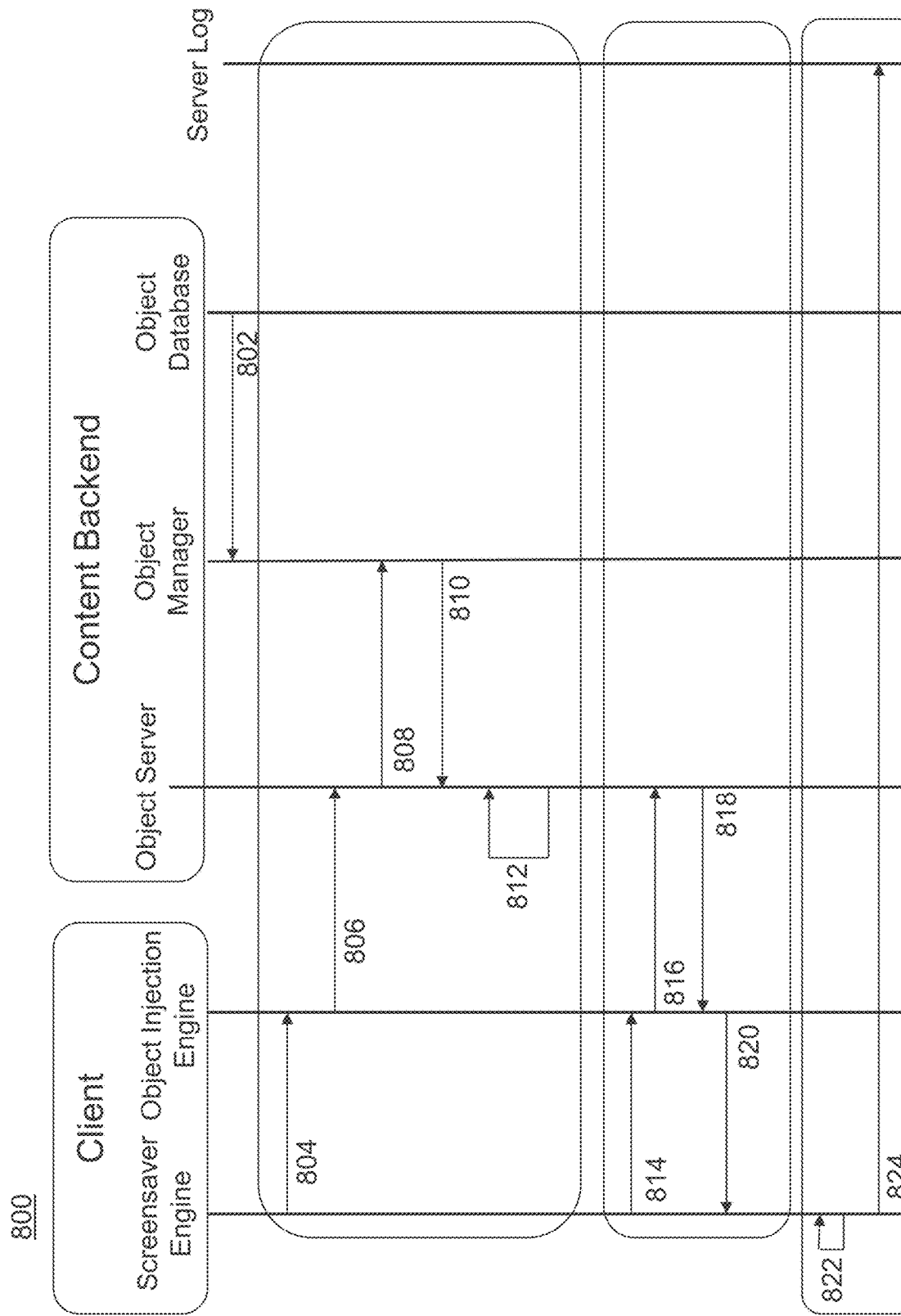
FIG. 8 illustrates a flow diagram 800 of communication within a media system implementing an object injection framework for a screensaver, according to some aspects.

FIG. 8 illustrates a flow diagram 800 of communication within a media system implementing an object injection framework for a screensaver, according to some aspects. Flow diagram 800 shows communications between a client device (e.g., media device(s) 106), content backend (e.g., system server(s) 126), and a server log. Client device may include a screensaver engine (e.g., screensaver engine 222) and an object injection engine (e.g., object injection engine 216). Content backend may include an object server (e.g., object server 134), an object manager (e.g., object manager 136), and an object database (e.g., object database 138).

At 802, object database 138 provides objects and related metadata to object manager for storage. Objects may include any objects previously discussed including objects, animated objects, dynamic objects, and/or interactive objects. Metadata includes information needed to inject the object into a screensaver which includes sizing, object type, and display requirements for the objects.

At 804, screensaver engine 222 detects the initiating of a screensaver by media device(s) 106 and may perform a determination whether to initiate an object injection process while the screensaver is being displayed. For example, screensaver engine 222 may check an internal setting or flag in media device(s) 106. The internal setting or flag may be activated or deactivated remotely by, for example, content backend to control when objection injection is performed. In some aspects, the internal setting or flag may be set based on information provided by sensor(s) 140, such as presence information about users within a vicinity of media device(s) 106.

At 806, upon initiating an object injection process, object injection engine 216 submits a notification to object server in content backend. In some aspects, the notification may include a request for any updated objects to be injected into the screensaver. The request may include an identifier of the screensaver currently displayed. In some aspects, object injection engine 216 may perform the object injection process without a notification to the content backend based on objects locally stored and accessible to object injection engine 216.

At 808, object server 134 may determine which objects to retrieve from object manager and to transmit to object injection engine 216 in response to the request received at 806. In some aspects, object server 134 may base this determination on at least one of the screensaver identifier, user information associated with the user of media device(s) 106, and provider requirements (e.g., as part of an advertisement campaign) that requirement fulfillment. For example, object server 134 may retrieve objects associated with the screensaver identifier, objects to personalize the screensaver based on the user information, and/or provider requirements associated with objects that are currently stored in object manager.

At 810, object manager 136 provides objects to object server 134.

At 812, object server 134 receives the objects and prepares an object package for the replacement objects that include the metadata that object injection engine uses to determine how and where to inject the objects in the screensaver. For example, object server may include layer information, object type, object size, frequency limits, and display limits in the object package along with the object. The object package may include one or more objects to be delivered to object injection engine 216.

Steps 802-812 represent a notification phase of the object injection process. Object server 134 prepares the object package with the one or more objects and associated metadata and waits for a request from object injection engine 216 before delivering the object packet. In some aspects, object server 134 may transmit the object package preemptively without waiting for a request. In some aspects, the object server 134 may transmit instructions to the object injection engine 216 when object injection engine 216 locally stores objects to be used for object injection.

At 814, screensaver engine 222 may initiate a request for objects to object injection engine 216. In some aspects, the request may be implemented as a request to generate an image map layout for the screensaver that is currently being displayed. In some aspects, the request and/or the replacement objects returned in response to the request may be based on one or more attributes including user viewing history, media device context, user behavior, and household attributes. Replacement objects may be selected based on these attributes and any injection policies that indicate when and what types of replacement objects are to be injected into a screensaver.

Examples of user viewing history include any content viewed by the user. This information may be linked to the user's account and therefore account for the user's viewing across one or more devices on which the user's account is installed (e.g., multiple devices in the user's household). The replacement objects may be associated with any of the content in the viewing history.

Examples of media device context include one or more of media device location, device type, applications installed on the media device, and a current time of day in the location where the media device is located. Replacement objects may reflect landmarks within a certain proximity of the location, reflect information associated the type of media device and/or installed applications. For example, replacement objects may be associated with streaming applications installed on the media device.

Examples of user behavior include payment history, purchasing history, browsing history (such as which applications or channels are used most by the user), and search history. This information may be provided by one or more devices, including a media device and a mobile device, used by the user.

Examples of household attributes include household income, demographics, education, and spending habits. This information may be provided by the user or based on passively tracked information such as the user behavior described above.

At 816, object injection engine 216 may transmit a request for the object package to object server 134.

At 818, object injection engine 216 receives the object package from object server 134.

At 820, object injection engine 216 may then dynamically inject the objects in the object package into the screensaver based on the requirements set by the associated metadata. Object injection engine 216 may then provide the updated screensaver for display by the screensaver engine.

Steps 814-820 represent steps for dynamically updated a currently displayed screensaver.

At 822, screensaver engine 222 displays the updated screensaver received from object injection engine 216.

At 824, screensaver engine 222 may track object metrics for each object such as frequency that an object was displayed, a duration that the object was displayed, and if relevant user interactions with the object (e.g., for dynamic objects and interactive objects).

Steps 822 and 824 represent steps for tracking views of the objects for data logging.

Figure 9:
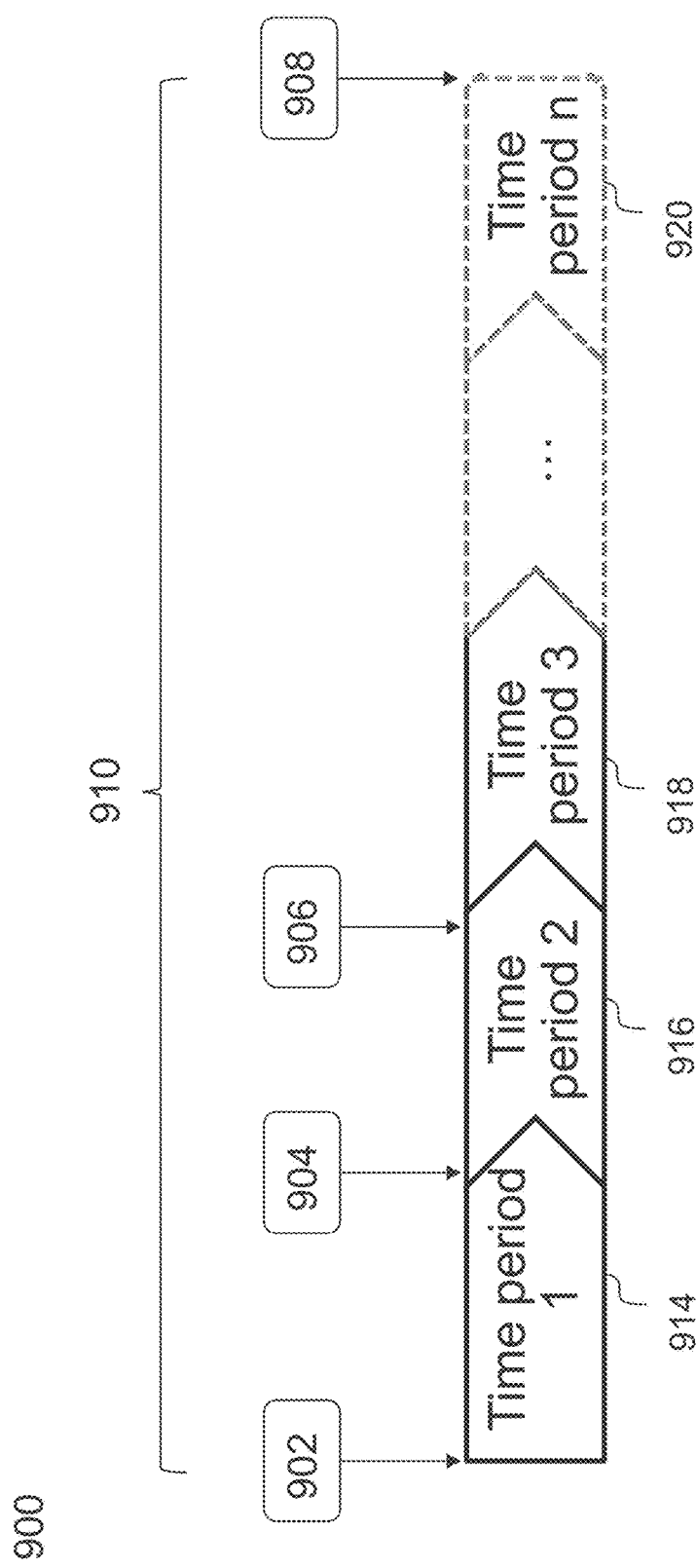
FIG. 9 illustrates an exemplary display loop for displaying and modifying a screensaver, according to some aspects.

FIG. 9 illustrates an exemplary display loop 900 for displaying and modifying a screensaver, according to some aspects. A screensaver may be displayed for multiple loops. Collectively, the multiple loops form a display loop for the screensaver. Loops may be for any period of time that is needed to display the full image of the screensaver for a particular scrolling speed. If an image has multiple layers, the period of time for a loop is based on the layer with the slowest scrolling speed.

Display loop 900 represents one session that the screensaver is displayed and begins when the screensaver is initiated (e.g., at 902) and ends when the screensaver is closed (e.g., at 912). Display loop 900 may comprise multiple loops with their time periods, including loop 914 with time period 1, loop 916 with time period 2, loop 918 with time period 3, and loop 920 with time period n. Display loop 900 may have a total duration 910 that includes the total time for displaying first loop 914, second loop 916, third loop 918, and nth loop 920.

In some aspects, each loop of display loop 900 may represent an object fetch cycle which represents when new objects (e.g., advertisements) are fetched from object server. In some aspects, new objects are fetched and injected for each loop of display loop 900. This means that each loop may result in purging old objects of screensaver and injecting new objects into screensaver for display. This cycle of fetching replacement objects, injecting replacement objects, and purging old objects from screensaver may occur at with each loop, every other loop, or based on requirements established for fetched replacement objects. Each display loop 900 may therefore have multiple periodic content fetch cycles.

In some aspects, each loop of display loop 900 may further include one or more screensaver loops. A screensaver loop may refer to the loop or length of time to display the entire image of the screensaver once. In some aspects, displaying the entire image means displaying all layers of the image on the on-screen portion of a viewer. Each loop may have one or more screensaver loops. As one example, a display loop 900 may be five hours, each loop (i.e., time period) may be one hour, each screensaver loop may be ten minutes, and each content fetch cycle may be one hour, which as explained above, means that content is fetched, displayed in a loop for one hour, and purged after an hour. In this example, each loop would include six screensaver loops, and the display loop would include five loops, and five content fetch cycles. In some aspects, the objects being requested during a content fetch cycle may include advertisements.

At 902, a screensaver is launched at media device(s) 106 which initiates first loop 914 of the display loop 900. First loop 914 has a time period 1. Upon initiation, media device(s) 106 may submit a notification which triggers a request for objects to be injected into the screensaver. The request may include information about the screensaver being displayed and object information, such as object types and object size. This request is received at a content backend which may trigger another request for each object from an object manager. Media device(s) 106 may receive the objects and injects them into screensaver during the loop 914. Metadata associated with each object may be used to determine the display of the object such as when each object is injected into the screensaver, where it is injected in the screensaver, which object is being replaced, how long the object is to be displayed, and how many times the object is viewable on-screen.

At 904, first loop 914 concludes and the screensaver starts a second loop 916 having time period 2. Because screensaver has reached the end of the content fetch cycle (i.e., end of time period 1) and because the screensaver is still active (i.e., in the same display loop 900), media device(s) 106 may then purge the objects received during the first loop 914. Media device(s) 106 may trigger requests for new objects to be injected during the second loop 916 following the same procedure as described in 902.

At 906, second loop 916 concludes and the screensaver starts a third loop 918 having time period 3. As the screensaver is still active and reached the end of a content fetch cycle, media device(s) 106 may perform the same purge-request functions described above to receive new objects to be injected during third loop 918

Display loop 900 may continue this cycle of loops until the nth loop 920 when the screensaver is closed or otherwise deactivated at 908.

Figure 10:
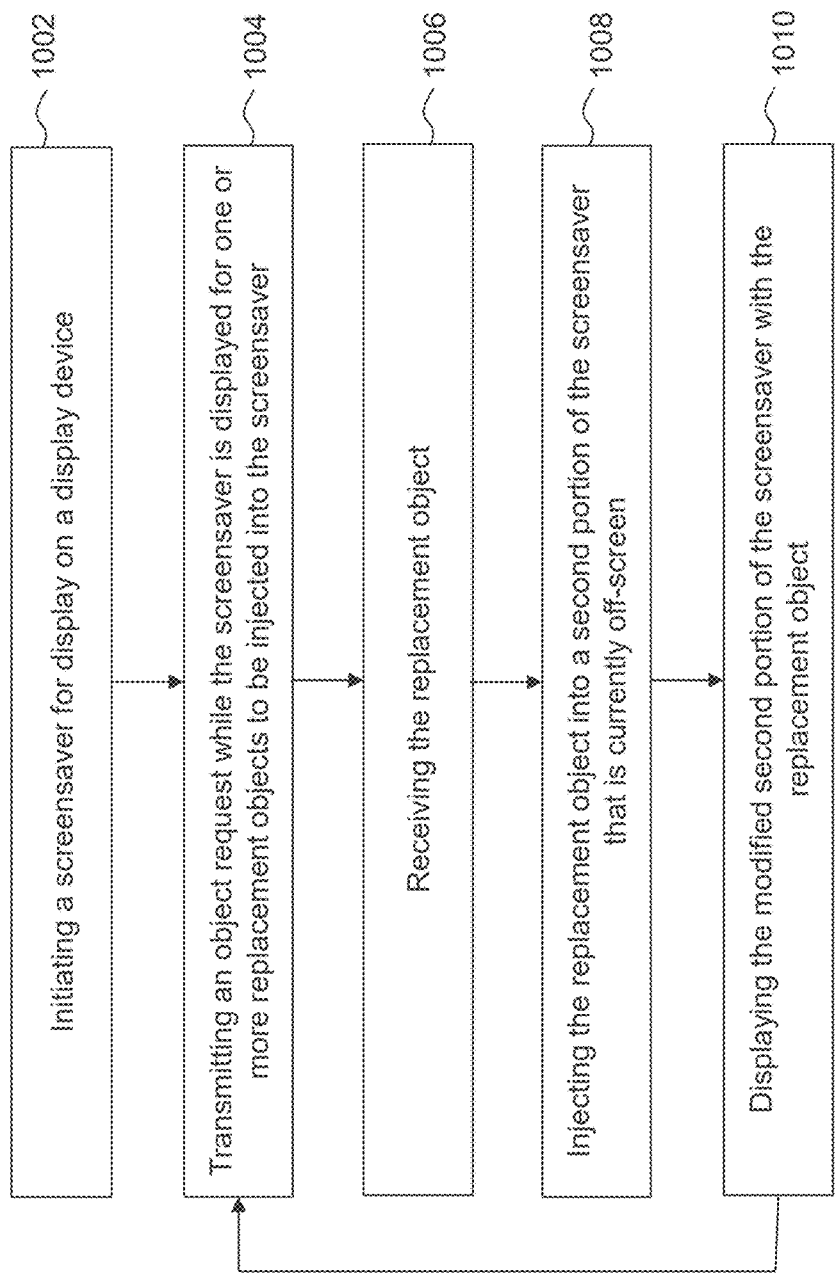
FIG. 10 illustrates a flowchart for displaying and modifying a screensaver, according to some aspects.

FIG. 10 illustrates a flowchart for displaying and modifying a screensaver, according to some aspects. Method 1000 can be performed by processing logic that can comprise hardware (e.g., circuitry, dedicated logic, programmable logic, microcode, etc.), software (e.g., instructions executing on a processing device), or a combination thereof. As a non-limiting example of FIGS. 1-2, one or more functions described with respect to FIG. 10 may be performed by a media device (e.g., media device(s) 106 of FIG. 1) or a display device (e.g., display device 108 of FIG. 1). In such an embodiment, any of these components may execute code in memory to perform certain steps of method 1000 of FIG. 10. While method 100 of FIG. 10 will be discussed below as being performed by certain components of multimedia environment 102, other components may store the code and therefore may execute method 1000 by directly executing the code. Accordingly, the following discussion of method 1000 will refer to components of FIGS. 1 and 2 as an exemplary non-limiting embodiment. Moreover, it is to be appreciated that not all steps may be needed to perform the disclosure provided herein. Further, some of the functions may be performed simultaneously, in a different order, or by the same components than shown in FIG. 10, as will be understood by a person of ordinary skill in the art In step 1002, media device(s) 106 may initiate the display of a screensaver on a display device. The screensaver may be divided into multiple portions, or panels, including a first panel and a second panel. Each of the panels may include a number of objects can be replaced with replacement objects. In some aspects, the screensaver may comprise an image whose total size cannot be full displayed on the display device Each panel may represent the portion of the screensaver that is either displayed on-screen on the display device or held off-screen (not displayed). In some aspects, the screensaver may comprise multiple layers, such as a background layer and foreground layer, that spans the multiple portions.

In step 1004, media device(s) 106 may transmit an object request to an object server while a first portion, or panel of the screensaver is displayed on the display device. The object request may include a request for one or more replacement objects to replace a current object of the screensaver. In some aspects, media device(s) may inject one or more replacement objects into an off-screen portion, the second panel, of the screensaver. The object request may include a screensaver identifier which may be used by the object server to identify replacement objects that match the display characteristics of objects that are currently in the screensaver.

In step 1006, media device(s) 106 may receive the one or more replacement objects from the object server based on information in the object request.

In step 1008, media device(s) 106 may perform an object injection process that includes replacing one or more objects of the screensaver. In some aspects, media device(s) 106 may perform the injection process on one or more objects that are off-screen (not currently being displayed) on the display device. For example, media device(s) 106 may select one or more objects from the second panel of the screensaver (that is currently off-screen) and inject the one or more replacement objects into the second panel to replace the one or more objects. This injection process results in a modified second panel and occurs prior to the second panel being displayed.

In step 1010, media device(s) 106 may then cause the screensaver to scroll on display device such that the first panel of the screensaver is not displayed on the display device (and goes off-screen) and the modified second panel of the screensaver is now displayed on the display device (and is now on-screen). This results in display of the replacement objects that have been injected into the screensaver.

If the screensaver session continues, media device(s) 106 may continue to cause the panels of the screensaver to be displayed in a loop. If the end of a content fetch cycle is reached, media device(s) 106 may return to step 1004 and request new replacement objects to be injected into screensaver.

Example Computer System

Figure 11:
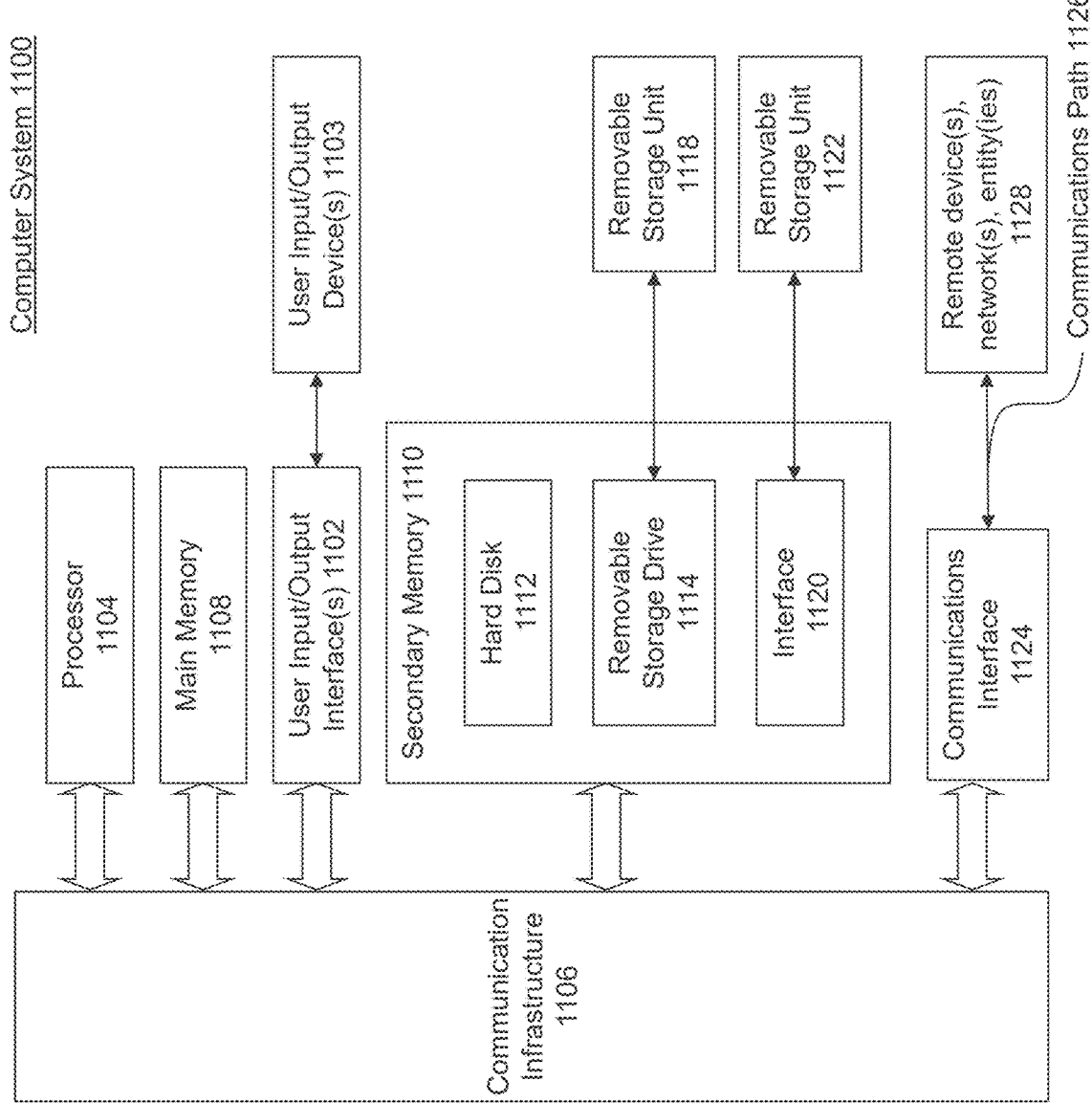
FIG. 11 illustrates an example computer system useful for implementing various aspects.

Various aspects may be implemented, for example, using one or more well-known computer systems, such as computer system 1100 shown in FIG. 11. For example, the media device(s) 106 may be implemented using combinations or sub-combinations of computer system 1100. Also or alternatively, one or more computer systems 1100 may be used, for example, to implement any of the aspects discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANS, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 11. In particular, aspects can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment." or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for dynamically adjusting a screensaver on a display device, comprising:
    initiating, by at least one computer processor, the screensaver for display on the display device, wherein the screensaver is divided into a plurality of panels including a first panel and a second panel, and wherein the screensaver comprises a plurality of layers including a background layer and a foreground layer;
    transmitting an object request to an object server while the first panel is displayed on the display device, and wherein the object request includes a request for a replacement object to replace a current object of the second panel;
    receiving the replacement object from the object server;
    identifying, based on metadata of the replacement object, a layer in the plurality of layers for inserting the replacement object, wherein the identified layer comprises one of the background layer or the foreground layer laver;
    replacing, in the identified layer, the current object of the screensaver with the replacement object to form a modified second panel of the screensaver, wherein the replacing is performed prior to displaying the second panel on the display device;
    scrolling the screensaver such that the first panel is not displayed on the display device and the modified second panel of the screensaver is displayed on the display device;
    displaying objects of the background layer on a first loop at a first looping speed; and
    displaying objects of the foreground layer on a second loop at a second looping speed.

2. The computer-implemented method of claim 1, wherein the screensaver is a scrolling screensaver where the first panel of the screensaver is displayed on the display device while the second panel is off-screen of the display device.

3. The computer-implemented method of claim 2, further comprising:
    displaying the plurality of panels of the scrolling screensaver in a loop, wherein the scrolling screensaver is a horizontally scrolling screensaver or a vertically scrolling screensaver.

4. The computer-implemented method of claim 1, wherein the object request is transmitted upon initiation of the screensaver.

5. The computer-implemented method of claim 1, wherein the at least one computer processor is implemented in a media device, wherein the object request is an ad request, wherein the ad request is generated based on at least one of a viewing history of a user associated with the at least one computing device, device context associated with the at least one computing device, a behavior history of the user, a shopping history of the user, an attribute of a household associated with the at least one computing device, and demographic information of the user.

6. The computer-implemented method of claim 1, wherein the object request is for a plurality of replacement objects.

7. The computer-implemented method of claim 1, further comprising:
    displaying objects of the background layer as a static image; and
    displaying objects of the foreground layer on a loop.

8. A system, comprising:
    one or more memories; and
    at least one processor each coupled to at least one of the memories and configured to perform operations for dynamically adjusting a screensaver on a display device, the operations comprising:
        initiating the screensaver for display on the display device, wherein the screensaver is divided into a plurality of panels including a first panel and a second panel, wherein the screensaver comprises a plurality of layers including a background layer and a foreground layer;
        transmitting an object request to an object server while the first panel is displayed on the display device, and wherein the object request includes a request for a replacement object to replace a current object of the second panel;
        receiving the replacement object from the object server;
        identifying, based on metadata of the replacement object, a layer in the plurality of layers for inserting the replacement object, wherein the identified layer comprises one of the background layer or the foreground layer;
        replacing, in the identified layer, the current object of the screensaver with the replacement object to form a modified second panel of the screensaver, wherein the replacing is performed prior to displaying the second panel on the display device;
        scrolling the screensaver such that the first panel is not displayed on the display device and the modified second panel of the screensaver is displayed on the display device;
        displaying objects of the background layer on a first loop at a first looping speed; and
        displaying objects of the foreground layer on a second loop at a second looping speed.

9. The system of claim 8, wherein the screensaver is a scrolling screensaver where the first panel of the screensaver is displayed on the display device while the second panel of the screensaver is off-screen of the display device.

10. The system of claim 9, the operations further comprising:
    displaying the plurality of panels of the scrolling screensaver in a loop, wherein the scrolling screensaver is a horizontally scrolling screensaver or a vertically scrolling screensaver.

11. The system of claim 8, wherein the object request is transmitted upon initiation of the screensaver.

12. The system of claim 8, wherein the object request is an ad request, wherein the ad request is generated based on at least one of a viewing history of a user associated with the at least one computing device, device context associated with the at least one computing device, a behavior history of the user, a shopping history of the user, an attribute of a household associated with the at least one computing device, and demographic information of the user.

13. The system of claim 8, wherein the object request is for a plurality of replacement objects.

14. A non-transitory computer-readable medium having instructions stored thereon that, when executed by at least one computing device, cause the at least one computing device to perform operations for dynamically adjusting a screensaver on a display device, the operations comprising:

initiating the screensaver for display on the display device, wherein the screensaver is divided into a plurality of panels including a first panel and a second panel, and wherein the screensaver comprises a plurality of layers including a background layer and a foreground layer;

transmitting an object request to an object server while the first panel is displayed on the display device, and wherein the object request includes a request for a replacement object to replace a current object of the second panel;

receiving the replacement object from the object server;

identifying, based on metadata of the replacement object, a layer in the plurality of layers for inserting the replacement object, wherein the identified layer comprises one of the background layer or the foreground layer;

replacing, in the identified layer, the current object of the screensaver with the replacement object to form a modified second panel of the screensaver, wherein the replacing is performed prior to displaying the second panel on the display device;

scrolling the screensaver such that the first panel is not displayed on the display device and the modified second panel of the screensaver is displayed on the display device;

displaying objects of the background layer on a first loop at a first looping speed; and displaying objects of the foreground layer on a second loop at a second looping speed.

15. The non-transitory computer-readable medium of claim 14, wherein the screensaver is a scrolling screensaver where the first panel of the screensaver is displayed on the display device while the second panel is off-screen of the display device.

16. The non-transitory computer-readable medium of claim 15, the operations further comprising:

displaying the plurality of panels of the scrolling screensaver sequentially in a loop, wherein the scrolling screensaver is a horizontally scrolling screensaver or a vertically scrolling screensaver.

17. The non-transitory computer-readable medium of claim 14, wherein the object request is transmitted upon initiation of the screensaver.

18. The non-transitory computer-readable medium of claim 14, wherein the object request is an ad request, wherein the ad request is generated based on at least one of a viewing history of a user associated with the at least one computing device, device context associated with the at least one computing device, a behavior history of the user, a shopping history of the user, an attribute of a household associated with the at least one computing device, and demographic information of the user.

* * * * *